United States Patent
Fay, II et al.

(10) Patent No.: US 10,279,643 B2
(45) Date of Patent: May 7, 2019

(54) POSITION-BASED HYDRAULIC LEVELING SYSTEM AND METHODS OF USING THE SAME

(71) Applicant: CNH Industrial America, LLC, New Holland, PA (US)

(72) Inventors: Jeffrey B. Fay, II, Oxford, PA (US); Gregory Fasick, Hatfield, PA (US)

(73) Assignee: CNH Industrial America LLC, New Holland, PA (US)

( * ) Notice: Subject to any disclaimer, the term of this patent is extended or adjusted under 35 U.S.C. 154(b) by 100 days.

(21) Appl. No.: 15/429,925

(22) Filed: Feb. 10, 2017

(65) Prior Publication Data
US 2018/0229571 A1 Aug. 16, 2018

(51) Int. Cl.
| | |
|---|---|
| *B60G 17/015* | (2006.01) |
| *B60G 17/019* | (2006.01) |
| *B60G 17/056* | (2006.01) |

(52) U.S. Cl.
CPC ....... *B60G 17/0152* (2013.01); *B60G 17/019* (2013.01); *B60G 17/0565* (2013.01); *B60G 2200/464* (2013.01); *B60G 2202/413* (2013.01); *B60G 2202/415* (2013.01); *B60G 2202/416* (2013.01); *B60G 2400/0514* (2013.01); *B60G 2500/30* (2013.01)

(58) Field of Classification Search
CPC ................ B60G 17/052; B60G 17/019; B60G 17/0565; B60G 17/00
See application file for complete search history.

(56) References Cited

U.S. PATENT DOCUMENTS

| | | | | |
|---|---|---|---|---|
| 2,974,976 | A * | 3/1961 | Lyall | B60G 17/052 180/22 |
| 3,662,962 | A | 5/1972 | Cobey | |
| 4,178,007 | A | 11/1979 | Martineau | |
| 4,306,686 | A | 12/1981 | Urbanczyk | |
| 4,314,709 | A * | 2/1982 | Silbernagel | B60G 17/052 280/405.1 |
| 4,869,054 | A * | 9/1989 | Hostetler | A01D 34/866 56/6 |
| 5,231,583 | A | 7/1993 | Lizell | |
| 5,253,467 | A | 10/1993 | Sims, Jr. | |
| 5,772,237 | A * | 6/1998 | Finch | A61G 5/06 180/65.1 |
| 6,752,224 | B2 * | 6/2004 | Hopper | A61G 7/08 180/19.1 |
| 7,159,695 | B2 | 1/2007 | Strong | |
| 8,020,648 | B2 | 9/2011 | Otto | |
| 8,065,054 | B2 | 11/2011 | Tarasinski et al. | |
| 8,387,378 | B2 | 5/2013 | Payne et al. | |

(Continued)

FOREIGN PATENT DOCUMENTS

| | | | | |
|---|---|---|---|---|
| WO | WO-2017201439 A1 * | 11/2017 | | A01F 15/08 |
| WO | WO-2017201452 A1 * | 11/2017 | | B62D 11/003 |

*Primary Examiner* — Nicole T Verley
(74) *Attorney, Agent, or Firm* — Patrick M. Sheldrake; Peter K. Zacharias

(57) ABSTRACT

The disclosure relates to a leveling system useful for self-leveling casters on suspension systems of harvesters, such as self-propelled windrowers. The suspension system utilizes position sensors and hydraulic actuators operably linked to each caster, the hydraulic actuators responding to a rotational position of the caster as detected by the respective position sensor to level the caster.

13 Claims, 19 Drawing Sheets

(56) References Cited

U.S. PATENT DOCUMENTS

| | | | | |
|---|---|---|---|---|
| 8,496,256 | B2* | 7/2013 | Bebernes | B62D 5/09 |
| | | | | 180/411 |
| 8,700,269 | B2* | 4/2014 | Hubalek | A01B 69/006 |
| | | | | 172/115 |
| 8,740,229 | B2* | 6/2014 | Ellsworth | B62D 6/04 |
| | | | | 180/282 |
| 8,910,975 | B2* | 12/2014 | Bekoscke | A61G 5/043 |
| | | | | 280/755 |
| 9,145,659 | B2 | 9/2015 | Walz et al. | |
| 9,168,784 | B2 | 10/2015 | DeChristopher et al. | |
| 9,234,582 | B2* | 1/2016 | Smith | B62D 11/003 |
| 9,290,074 | B2* | 3/2016 | Slawson | B60G 17/005 |
| 9,351,889 | B2* | 5/2016 | Mulhern | A61G 5/04 |
| 9,930,824 | B2* | 4/2018 | Nafziger | A01B 69/007 |
| 10,004,651 | B2* | 6/2018 | DeLuca | A61G 1/0243 |
| 2004/0061292 | A1 | 4/2004 | Hall | |
| 2014/0262559 | A1 | 9/2014 | DeChristopher et al. | |
| 2015/0223386 | A1 | 8/2015 | Nafziger et al. | |
| 2016/0113200 | A1 | 4/2016 | Gofron et al. | |
| 2016/0140861 | A1* | 5/2016 | Tischer | A63G 31/16 |
| | | | | 434/69 |
| 2018/0093708 | A1* | 4/2018 | Soldan | B62D 11/24 |
| 2018/0201310 | A1* | 7/2018 | Rotole | B62D 1/286 |

* cited by examiner

POSITION-BASED HYDRAULIC LEVELING SYSTEM AND METHODS OF USING THE SAME

BACKGROUND

Harvesters such as windrowers, tractors, and forage harvesters have to balance functionality with weight distribution. On one hand, the harvester needs to include a hitch at the front of the vehicle so that it can attach a header or some other harvesting equipment. On the other hand, the harvesting equipment is very heavy when attached on the front of the vehicle. If the vehicle is operating with a header attachment, the shock absorbers must accommodate weight distributed on the front end of the vehicle. If the header is not attached to the vehicle, the weight distribution of the vehicle is altered dramatically on most current vehicle designs such that the front of a harvester may be elevated over a horizontal or substantially horizontal plane. This elevation makes it difficult to attach a header.

Typical construction for such vehicles include front ground wheels mounted on the frame at fixed angles parallel to each other and parallel to a center line of the frame and rear ground wheels mounted on a respective caster. Each of the front ground wheels is typically driven by a respective drive motor which allows variable speed in both the first and second directions such that steering of the tractor is effected by a differential in speed between the front wheels with the rear wheels following the steering in a castering action. A pair of dampers or shock absorbers are each connected between a bracket on a rear axle of the frame and a lever in the caster plane of the caster so as to provide a damping force tending to restrict rotation of the respective second wheel about the respective vertical pivot axis with the damping force at a maximum value when the rear wheels are parallel to the center line in either the forward or reverse directions.

Such hydrostatically driven vehicles used primarily for swathing are commonly used and readily available. The vehicles typically carry at a forward end on suitable sprung supports a header for cutting standing crop with the crop being transported on the header to a suitable discharge location generally centrally of the vehicle for forming a swath in the field from the cut crop.

Such vehicles generally include a pair of front wheels just behind the header which are fixed to the frame of the vehicles so that they remain at an angle parallel to each other and parallel to a center line of the tractor. The tractor is supported at the rear end by a pair of caster wheels which are attached to a cross axle pivotally connected to the frame at a center horizontal pivot point, commonly known as a walking beam. The axle is typically supported relative to the ground with the caster wheels at the ends of the rear axle so that the wheels trail behind a vertical pivot mount for the wheels.

The front wheels only are driven and are driven in a manner which allows full control in the forward and reverse directions so that steering is effected by a differential speed between the two front wheels with the rear wheels following in the conventional castering action.

It is also known that such vehicles can travel more effectively at high speed when reversed in direction so that the driven wheels are at the rear and the caster wheels at the front. The caster wheels of course rotate through 180° to trail behind the vertical pivot which is now forward of the caster wheels as the tractor moves at relatively high speed in this reversed direction.

Caster leveling is an inherent problem on vehicles of the above type. In some vehicles, the rear of the vehicle rises dramatically when reversing, resulting in issues with header clearance. In some vehicles, the rear of the vehicle can squat excessively due to the reduced wheelbase, thereby placing an increased load on the rear axle of the vehicle during reversing maneuvers.

Many such vehicles use as the rear suspension of the rear caster wheels air bags (e.g., shock absorbers) as the springing medium. However, manual adjustments by the operator of the air bags is necessary using separate air pumps when there is a change of header weight or a change of conditions, requiring a different spring rate and/or ride height. Such manual adjustments necessitate that the operator exit the vehicle to insert axle lockout pins into the air bags when removing the header to stop the suspension action of the air bags, and remove the axle lockout pins from the air bag when using the header such that adequate suspension action is provided.

For example, FIGS. 1-7 show side, perspective and detailed views of an exemplary conventional windrower 10 having a rear suspension system 12. The windrower 10 generally includes front wheels 14, 16 rotatably mounted to a frame 18, and the rear suspension system 12 mounted to the frame 18. The windrower 10 includes a cabin 20 configured and dimensioned to receive an operator, and having a plurality of controls for operation of the windrower 10, such as controlling a header (not shown) attachable to an attachment mechanism 22 at the front of the windrower 10, controlling movement of the windrower in a forward direction 24, and controlling movement of the windrower in a reverse direction 26. The rear suspension system 12 includes a damper or shock absorber 28a, 28b (e.g., a shock or fixed hydraulic actuator) and an air bag or shock absorber 30 mounted to a rear axle 32a, 32b for regulating positioning of each caster 34, 36 upon which respective caster wheels 38, 40 are mounted.

FIGS. 2-7 show detailed views of the rear suspension system 12. The shock absorber 30 includes a top section 42 that is positioned above and receives therein a bottom section 44. The shock absorber 30 includes a dampening element (e.g., a spring, air, or the like) disposed within the shock absorber 30. The top and bottom sections 42, 44 move relative to each other as the dampening element absorbs motions of the casters 34, 36. As shown in FIG. 4, the shock absorber 30 includes a slidable lockout pin 46 disposed below the bottom section 44 with a fastener pin 48 that maintains the desired position of the lockout pin 46. FIG. 4 shows the lockout pin 46 in the extended position, allowing the shock absorber 30 to provide suspension action. FIG. 5 shows the lockout pin 46 in the inserted position to prevent suspension action from the shock absorber 30 when removing the header. As noted above, adjustment of the position of the lockout pin 46 requires manual intervention from the operator, resulting in delay in operation of the windrower 10.

As shown in greater detail in FIGS. 6 and 7, the rear suspension system 12 includes two suspended left-hand and right-hand suspension assemblies. Each assembly includes a rear axle 32a, 32b operably attached to a respective caster 34, 36 through an absorber system which includes a mounting bracket 50a, 50b and a damper or shock absorber 28a, 28b. The casters 34, 36 are typically operably connected to a rear wheel assembly that includes a wheel and tire (e.g., wheels 38, 40) fixed to the bottom portion of the caster 34, 36 and allow some pivotal movement of the rear wheel and rear tire about a vertical axis that coincides with the attachment to the bottom portion of the casters 34, 36. The rear suspension system 12 can be mechanically attached to the frame 18 of the windrower 10. The right and left hand axles 32a, 32b are operably attached to the frame 18 by a plurality of fastening elements, which in this configuration, allow for a suspended left and right handed axle 32a, 32b. A ballast box 52 is part of the main frame 18 of the windrower 10 and provides balance to the rear portion of the vehicle.

FIG. 1 shows the caster 34 oriented in a reverse direction of travel and the caster 36 oriented in a forward direction of travel to illustrate the tendency of the casters 34 to lift off the ground 56 by, e.g., a height 60, and rotate during the reverse direction of travel. The casters 34, 36 rotate about a fixed rotational axis 54, 58, with the orientation of the axis 54, 58 relative to the ground 56 being controlled by the design of the rear axle of the windrower 10. Two different axis 54, 58 orientations are provided in FIG. 1 for illustrative purposes. When the caster pivot axis 54 is perpendicular to the ground 56, the rear of the windrower 10 lowers when reversing because the rotation is parallel to the ground 56, but the reduction in wheelbase transfers weight to the rear axle 32a, 32b, collapsing the suspension which must be compensated for by displacing volume in the shock absorbers 30.

SUMMARY

The disclosure relates to an active, self-leveling suspension system (e.g., a rear suspension system) that individually adjusts the levels of each caster wheel in both rising and squatting rear end situations without manual intervention from an operator. The suspension system includes position sensors associated with each of the casters that monitor and detect the rotational position or angle of each respective caster relative to the frame and/or rear axle. Based on the rotational position of the caster, the position sensor transmits signals to hydraulic actuators causing the hydraulic actuators to adjust the level of the respective rear axle.

In accordance with some embodiments of the present disclosure, an exemplary harvester is provided. The harvester comprises a vehicle frame configured for attachment to an implement to be moved in a longitudinal working direction across the ground. The harvester comprises at least one rear axle positioned transversely to the longitudinal working direction of the harvester and operably attached to the vehicle frame. The rear axle comprises first and second caster connection points on opposing sides of the harvester. The harvester comprises a first caster pivotally mounted to the rear axle at the first caster connection point, and a second caster pivotally mounted to the rear axle at the second caster connection point.

The harvester comprises a first position sensor configured to detect a rotational position of the first caster relative to the rear axle, and a second position sensor configured to detect a rotational position of the second caster relative to the rear axle. The harvester comprises a first hydraulic actuator operably mounted to the rear axle and configured to level the first caster (e.g., the rear axle associated with the first caster) based on the rotational position of the first caster detected by the first position sensor. The harvester comprises a second hydraulic actuator operably mounted to the rear axle and configured to level the second caster (e.g., the rear axle associated with the second caster) based on the rotational position of the second caster detected by the second position sensor.

The harvester comprises a master hydraulic actuator in fluid communication with the first and second hydraulic actuators. The harvester comprises a third position sensor configured to detect a magnitude of extension of the master hydraulic actuator. The harvester comprises an accumulator in fluid communication with the first and second hydraulic actuators. The harvester comprises a hydraulic valve manifold, the first and second hydraulic actuators each in fluid communication with a pump and a tank via the hydraulic valve manifold. The harvester comprises a first directional valve and a second directional valve. The first directional valve is in fluid communication with an accumulator and the first and second hydraulic actuators, and is configured to control the accumulator between closed, open to pump, or open to tank operable modes with barrel ends of the first and second hydraulic actuators. The second directional valve is in fluid communication with a master hydraulic actuator, and is configured to control the master hydraulic actuator between closed, open to pump, or open to tank operable modes.

The first position sensor can be mounted at or near the first caster connection point. The first caster connection point defines a substantially vertical pivot axis of the first caster. The second position sensor can be mounted at or near the second caster connection point. The second caster connection point defines a substantially vertical pivot axis of the second caster. The harvester comprises a first pair of ground wheels mounted on the first and second casters. The harvester comprises a ballast box mounted to a rear edge of the vehicle frame. The harvester can be chosen from a windrower, a lawn mower, a forage harvester, a tractor, or a similar vehicle.

In accordance with some embodiments of the present disclosure, an exemplary method of leveling a harvester is provided. The method comprises providing a harvester including a vehicle frame configured for attachment to an implement to be moved in a longitudinal working direction across the ground. The harvester comprises at least one rear axle positioned transversely to the longitudinal working direction of the harvester and operably attached to the vehicle frame, the rear axle including first and second caster connection points on opposing sides of the harvester. The harvester comprises a first caster pivotally mounted to the rear axle at the first caster connection point and a second caster pivotally mounted to the rear axle at the second caster connection point. The harvester comprises first and second position sensors. The harvester comprises first and second hydraulic actuators operably mounted to the rear axle.

The method comprises detecting a rotational position of the first caster relative to the rear axle with the first position sensor. The method comprises detecting a rotational position of the second caster relative to the rear axle with the second position sensor. The method comprises leveling the first caster (e.g., the rear axle associated with the first caster) with the first hydraulic actuator based on the rotational position of the first caster detected by the first position sensor. The method comprises leveling the second caster (e.g., the rear axle associated with the second caster) with the second hydraulic actuator based on the rotational position of the second caster detected by the second position sensor. The method comprises providing information to an operator via an operator interface about a leveling status of the first and second casters. The method comprises controlling an accumulator in fluid communication with the first and second hydraulic actuators with a first directional valve between closed, open to pump, or open to tank operable modes. The method comprises controlling a master hydraulic actuator with a second directional valve between closed, open to pump, or open to tank operable modes. In some embodiments, the disclosure relates to a method of operating a harvester in any one of the operating conditions or modes without a step of reversing the harvester vehicle direction for any distance prior to moving forward in the one or plurality of conditions or modes. In particular, in some embodiments, the disclosure relates to a method of operating a harvester free of backward movement of the harvester when transitioning the harvester from one operational mode to another operational mode.

In accordance with some embodiments of the present disclosure, an exemplary leveling system, configured for operation on a harvester including at least one axle, is provided. The leveling system comprises at least one caster pivotally mounted to the axle. The leveling system comprises at least one position sensor configured to detect a rotational position of the at least one caster relative to the axle. The leveling system comprises at least one hydraulic actuator operably mounted to the axle and configured to level the at least one caster based on the rotational position of the at least one caster detected by the at least one position sensor. The leveling system comprises a master hydraulic actuator in fluid communication with the at least one hydraulic actuator. The leveling system comprises an accumulator in fluid communication with the at least one hydraulic actuator. The leveling system comprises a first directional valve configured to control the accumulator between closed, open to pump, or open to tank operable modes. The leveling system comprises a second directional valve configured to control the master hydraulic actuator between closed, open to pump, or open to tank operable modes.

In accordance with some embodiments of the present disclosure, an exemplary kit is provided. The kit comprises at least one position sensor configured for being mounted on an axle of a harvester. The least one position sensor is configured to detect a rotational position of a caster relative to the axle. The kit comprises at least one hydraulic actuator configured for being mounted to the axle of the harvester and configured to level the caster (e.g., the axle associated with the caster) based on the rotational position of the caster detected by the position sensor. The kit comprises at least one hydraulic circuit comprising a hydraulic circuit manifold. The hydraulic circuit manifold and the at least one hydraulic actuator are configured for fluid communication with each other and a hydraulic circuit in the harvester.

In some embodiment, the kit comprises a software program product that is configured for use with a software system of the harvester and comprises executable code that executes transition of the hydraulic circuit between a first hydraulic state, a second hydraulic state, and a third hydraulic state. The first hydraulic state comprises diverting pressurized fluid in the hydraulic circuit to position an accumulator in a closed configuration. The second hydraulic state comprises diverting pressurized fluid in the hydraulic circuit to position the accumulator in an open to pump configuration. The third hydraulic state comprises diverting pressurized fluid in the hydraulic circuit to position the accumulator in an open to tank configuration.

In some embodiment, the kit comprises a software program product that is configured for use with a software system of the harvester and comprises executable code that executes transition of the hydraulic circuit between a first hydraulic state, a second hydraulic state, and a third hydraulic state. The first hydraulic state comprises diverting pressurized fluid in the hydraulic circuit to position a master hydraulic actuator in a closed configuration. The second hydraulic state comprises diverting pressurized fluid in the hydraulic circuit to position the master hydraulic actuator in an open to pump configuration. The third hydraulic state comprises diverting pressurized fluid in the hydraulic circuit to position the master hydraulic actuator in an open to tank configuration.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed hydraulic leveling system, reference is made to the accompanying figures, wherein.

DETAILED DESCRIPTION

Figure 1:
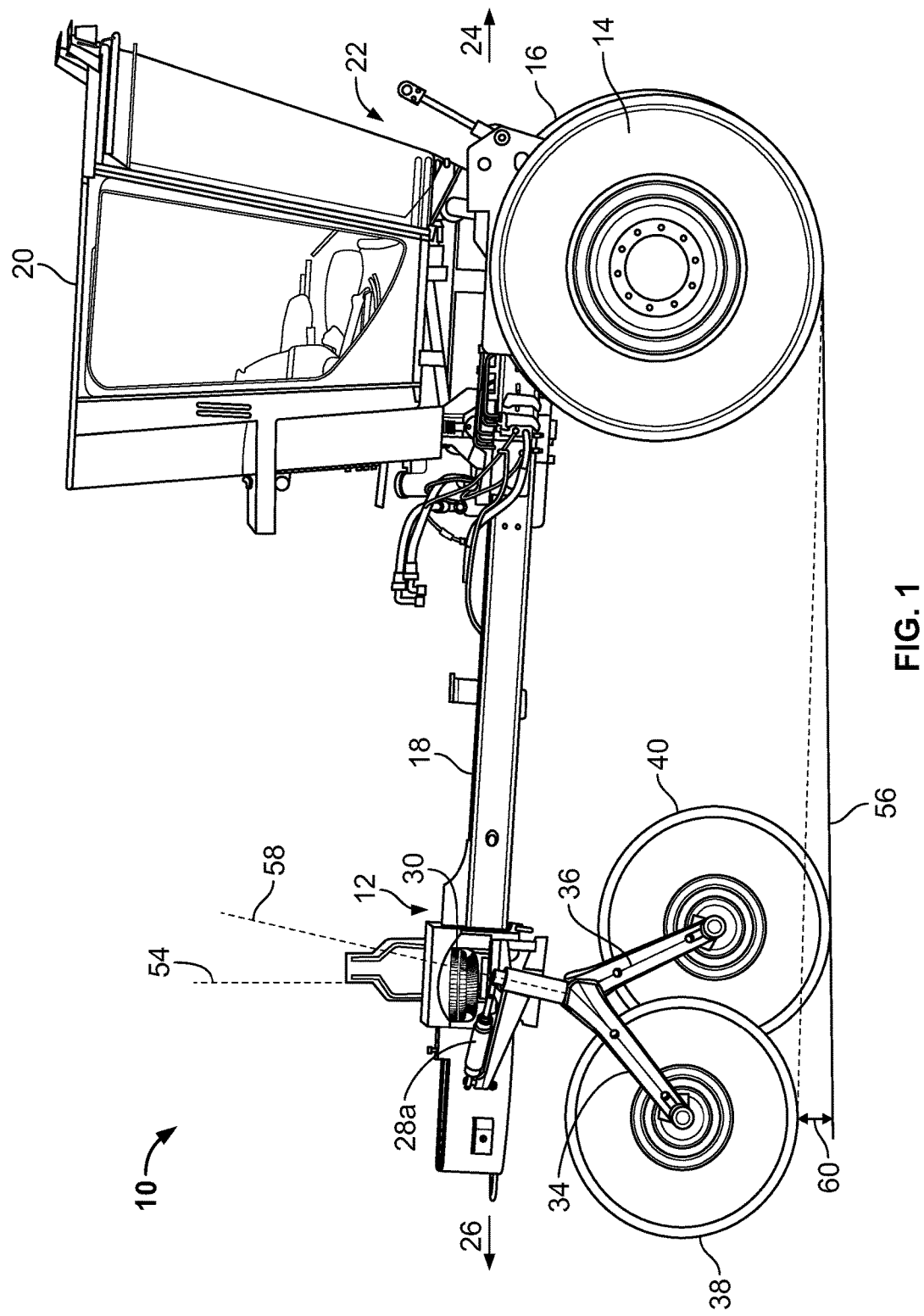
FIG. 1 is a side view of a conventional windrower including a rear suspension system.
Figure 2:
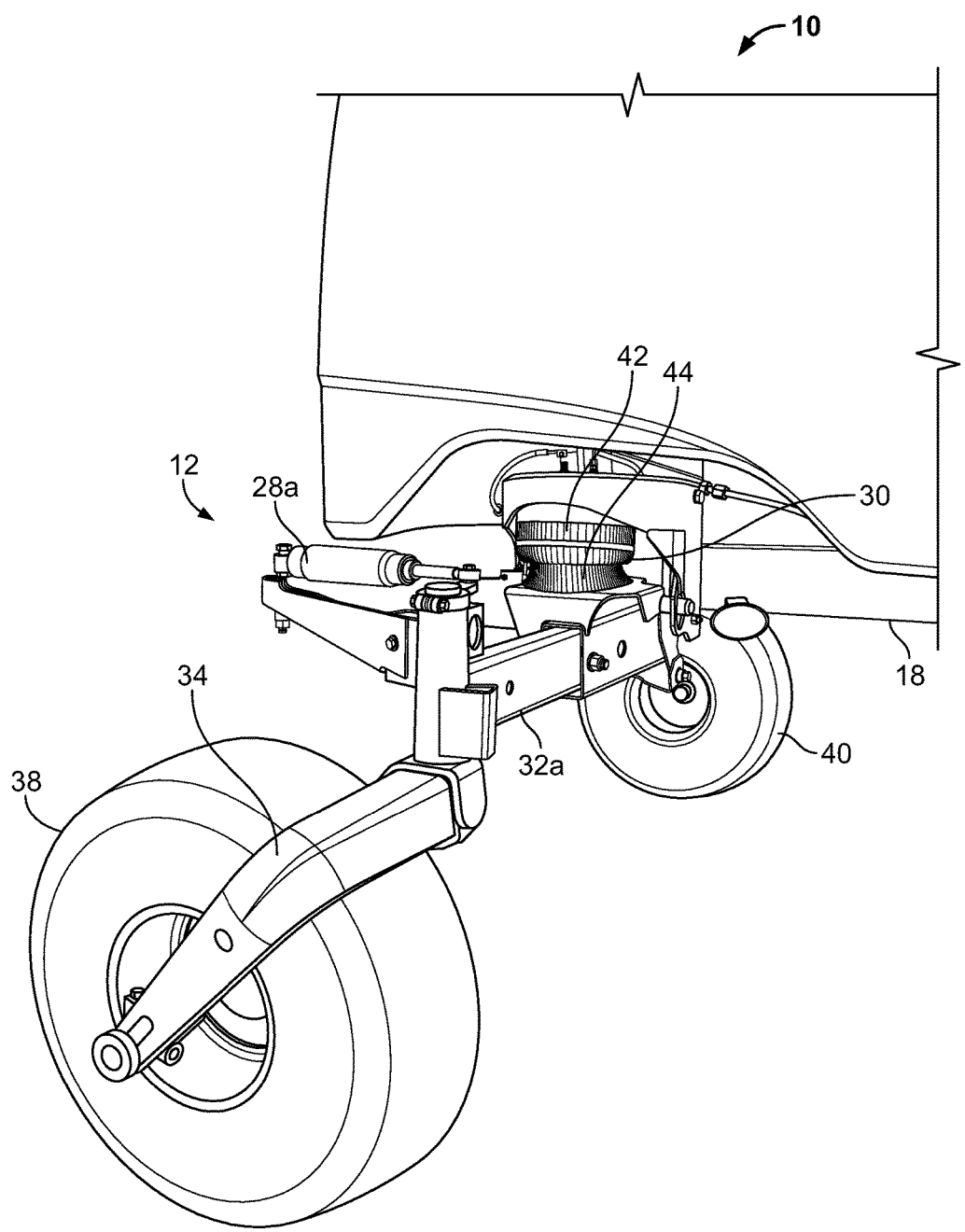
FIG. 2 is a detailed view of a rear suspension system of a conventional windrower.
Figure 3:
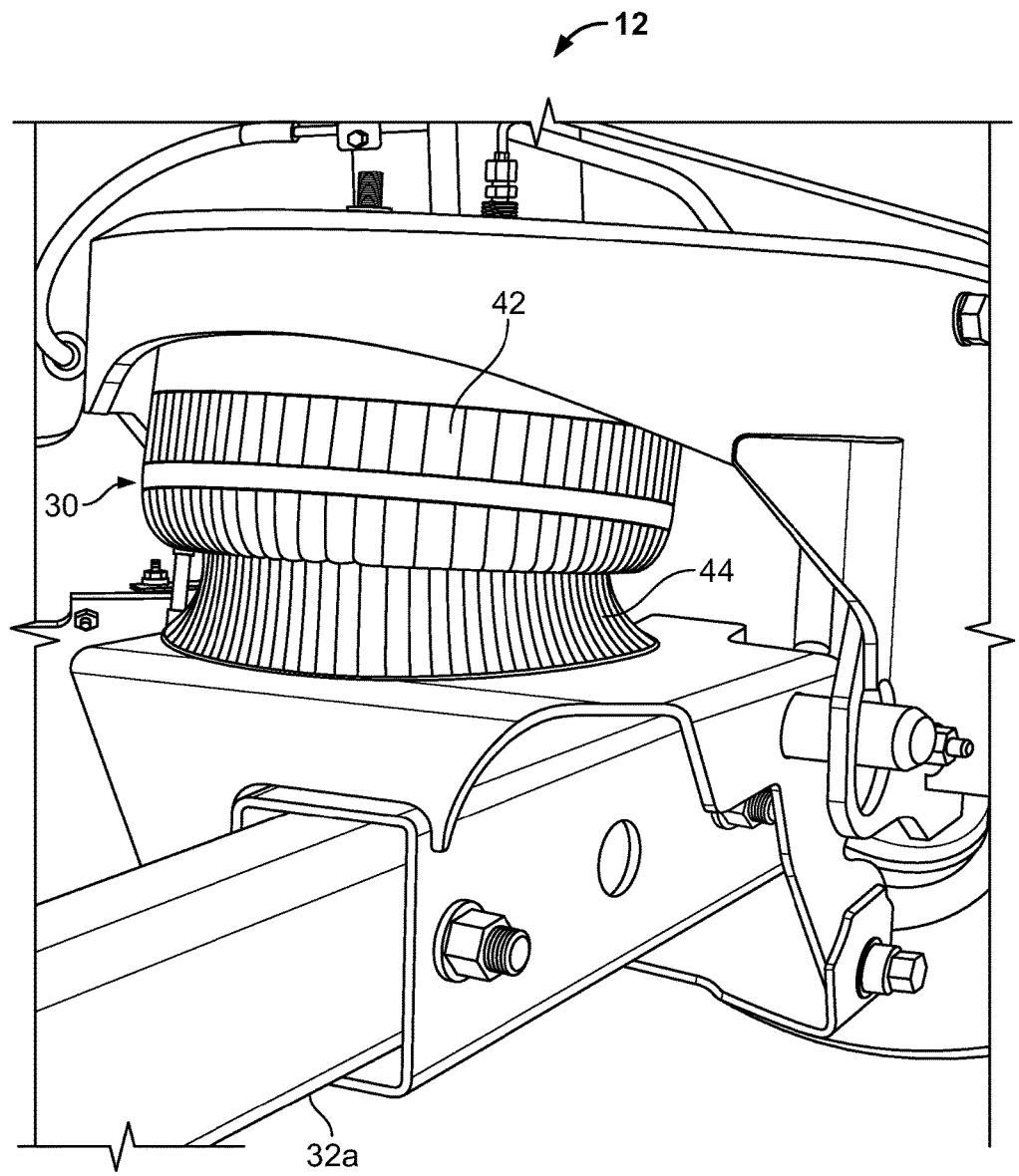
FIG. 3 is a detailed view of a rear suspension system of a conventional windrower.
Figure 4:
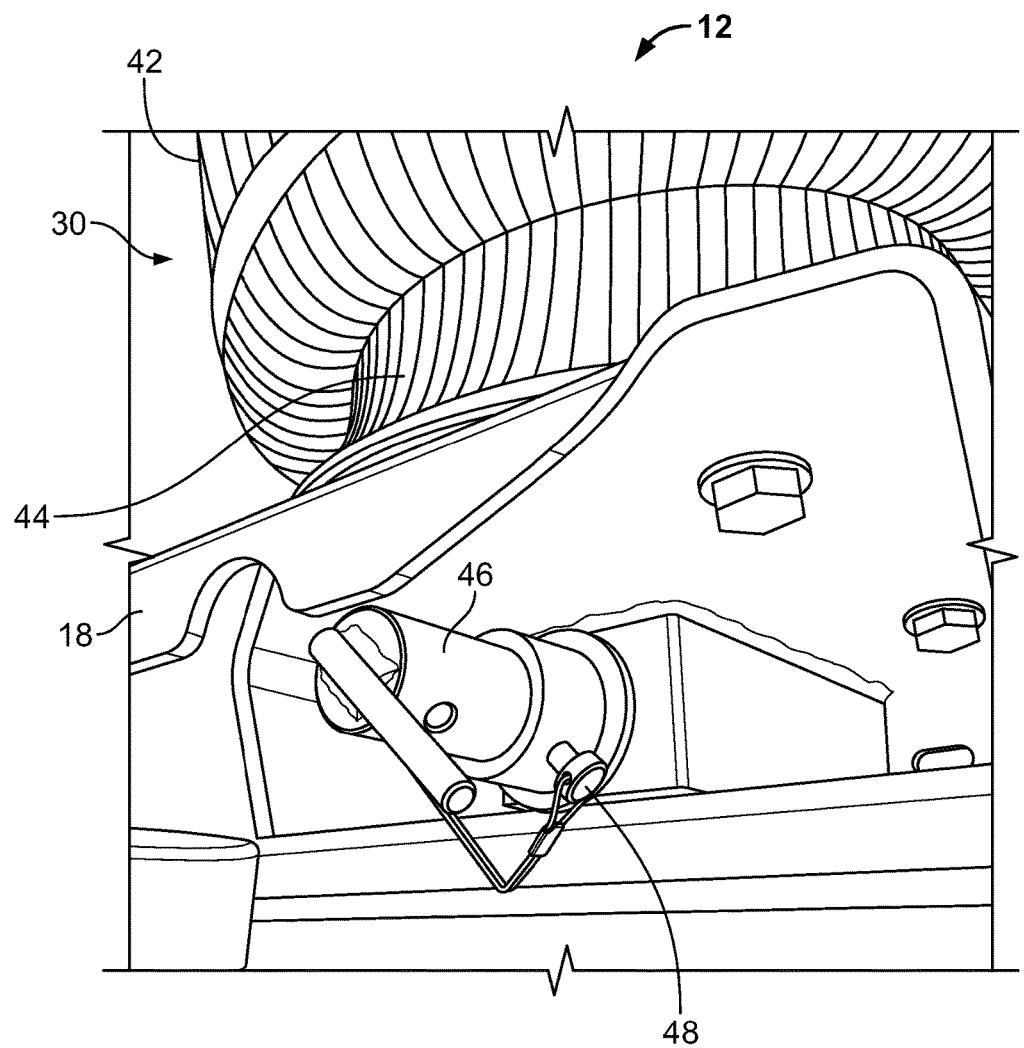
FIG. 4 is a detailed view of a rear suspension system of a conventional windrower with a lockout pin in an extended position.
Figure 5:
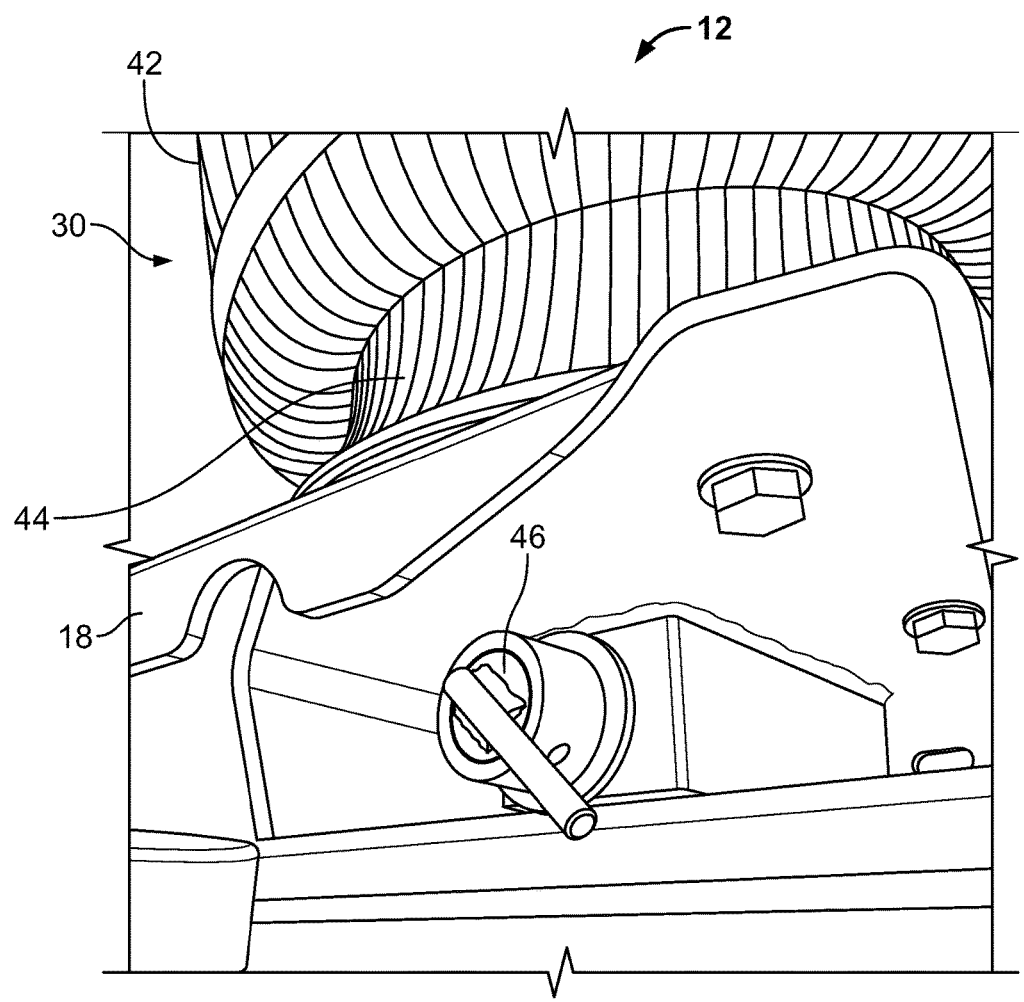
FIG. 5 is a detailed view of a rear suspension system of a conventional windrower with a lockout pin in an inserted position.
Figure 6:
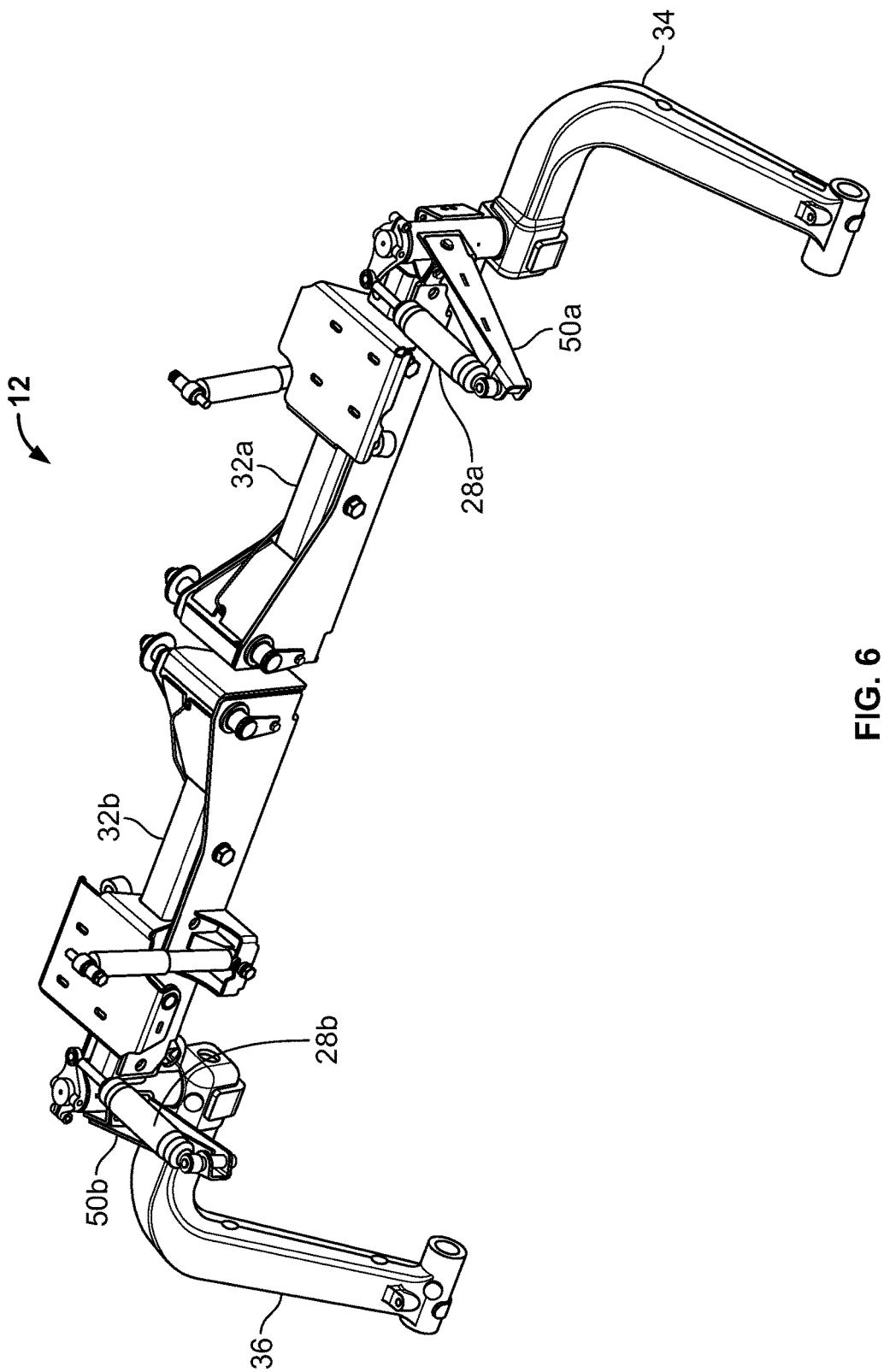
FIG. 6 is a perspective view of a conventional rear suspension system designed for a windrower.
Figure 7:
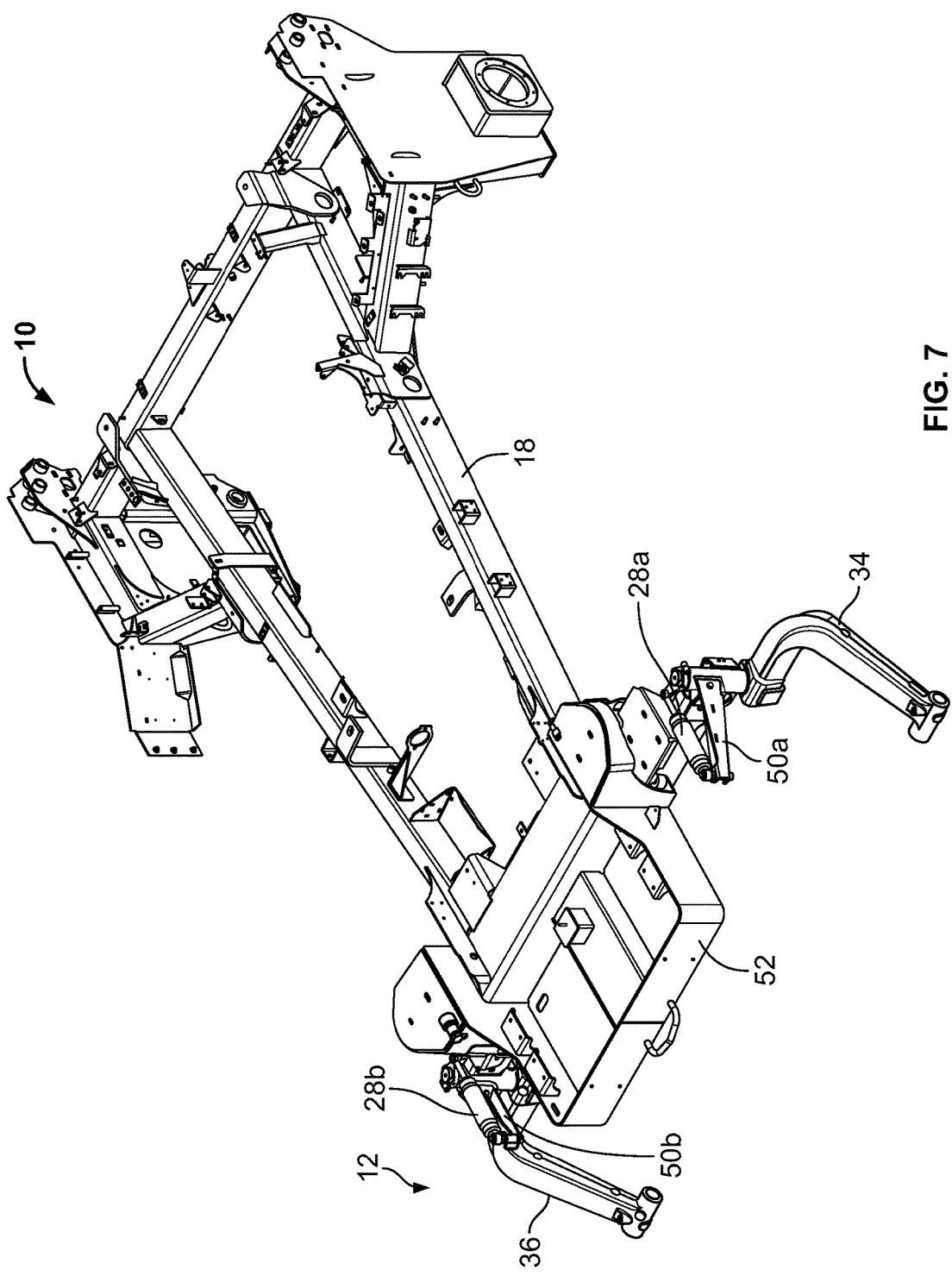
FIG. 7 is a perspective view of a convention rear suspension system attached to a frame of a windrower.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g., 3, 4, or 5.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "about" as used herein when referring to a measurable value such as an amount, a temporal duration, and the like, is meant to encompass variations of ±20%, ±10%, ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% from the specified value, as such variations are appropriate to perform the disclosed methods.

The term "harvester" as used herein is defined as a machine that consolidates and/or packages material so as to facilitate the storage and handling of the material for later use. In some embodiments, the harvester is used to harvest agricultural material. In some embodiments, the harvester is a windrower, a hay forager, lawn mower or a combine including a baling mechanism. In some embodiments, the harvester is a self-propelled windrower.

The term "material" as used herein is defined as a numerous individual items that are harvested or collected by the harvester. In some embodiments, the material is agricultural crop, such as hay or silage. In some embodiments, the material is biomass.

The term "damper" as used herein is defined as any device that deadens vibrations or movement of a mechanical component or assembly.

The term "leveler" as used herein is defined as any device that levels a mechanical component or assembly.

The term "suspension system" as used herein is defined as an assembly or mechanical arrangement that cushions the ride of a harvester. In some embodiments, the suspension system includes hydraulic cylinders or actuators including pressurized fluid inlet/outlet and one or a plurality of fluid lines in fluid communication with a pressurized fluid reservoir. The disclosure generally relates to a rear suspension system designed for a harvester. In some embodiments, the harvester is a self-propelled windrower. In some embodiments, the suspension system is free of a fixed spring shock absorber.

The term "information" as used herein is defined as data values attributed to parameters. In some embodiments, information is digital and/or analog information. In some embodiments, information is the current operable mode of the harvester. In some embodiments, information is the rotational position or angle of a caster relative to the frame or axle. In some embodiments, warning information can be audio and/or visual information. In some embodiments, information includes whether the casters operably linked to an axle are moving during operation of the harvester in one or a plurality of operable modes. In some embodiments, warning information is information that is capable of alerting an operator that an action may need to be taken.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, or harvester. In some embodiments, the harvester includes a software system with executable code that executes different hydraulic states based on operator selection of forward or rearward direction of travel and/or the rotational position of the caster relative to the frame and/or axle. In some embodiments, the disclosure also relates to a computer software product with executable code that automatically toggles between or through different hydraulic states based on operator selection of forward or rearward direction of travel and/or the rotational position of the caster relative to the frame and/or axle. In some embodiments, the disclosure relates to the above-identified software and at least one or more suspension systems including at least one hydraulic cylinder and at least one position sensor operably connected to a hydraulic circuit configured for retrofitting the suspension system to the caster shock absorbing system of a previously purchased or leased harvester. The software program product may be on any medium or a component of a system optionally configured for update or install into the software of an existing harvester.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, the disclosure relates to a processing system including a processing device suitable for storing and/or executing program code and may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. In some embodiments, the memory is capable of storing preferred settings or information about the level of the casters or a predetermined value or value of the rotational position of the caster around when the harvester should transition between different hydraulic states. In some embodiments, the software program product may be manually set or set for manual transition or automatic transition depending upon a rotational position of the caster relative to the frame and/or axle as detected by a position sensor. In some embodiments, the system includes one or a plurality of position sensors to detect the rotational position of casters relative to the frame and/or axle, and to detect the extension or retraction of each hydraulic actuator. The sensors may be hard wired to one or more wires creating a physical connection to one or a plurality of controllers and/or are active sensors can be activated and used over a WiFi hotspot, Bluetooth® or other internet connection with controllers capable of receiving such remote signals.

In some embodiments, input/output or I/O devices (including but not limited to keyboards, displays, pointing devices, etc.) may be coupled to the system either directly or through intervening I/O controllers. In some embodiments, I/O devices may be coupled to the system directly or to I/O controller by an I/O bus (cables and or wires which connect the devices and enable the information to pass therebetween). In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used. Any sensor disclosed herein may function on any disclosed harvester by integration into one or more data processing systems of the harvester. For example, in some embodiments, the disclosure relates to a data processing system including executable software program product configured for sending and receiving information about the rotational movement of a caster relative to the frame and/or axle. The system may process this information, optionally store it and then execute code to transition the hydraulic circuit between different hydraulic states. In some embodiments, the system may be configured by the operator to transition the harvester between different hydraulic states in synchrony or substantial synchrony to operator-initiated transition from a forward to a reverse direction of travel of the harvester. In some embodiments, the data processing system of the harvester transitions the harvester between different hydraulic states in synchrony or substantial synchrony to operator-initiated transition from a forward to a reverse direction of travel of the harvester. In some embodiments, the data processing system of the harvester transitions the harvester between different hydraulic states in synchrony or substantial synchrony to operator-initiated transition from a forward to a reverse direction of travel of the harvester depending upon real-time information sent to a controller by a sensor that monitors the real-time rotational movement and/or position of one or a pair of casters in electronic communication with the data processing system.

The term "real-time" and the phrase "in real-time" as used herein are defined as a way of describing a process, event, or action that occurs simultaneously with the process of actively operating a harvester. In some embodiments, various sensors, for example a position sensor, continuously sense information about the rotational position of the casters and transmit that information to a controller in real-time. In some embodiments, an operator may adjust values or thresholds for one or more hydraulic states in real-time through the operator interface by accessing the system electronically and inputting one or a plurality of values.

In some embodiments, the system or harvester of the disclosure includes one or more position sensors. As disclosed in the above paragraph, rotational movement of the casters on the harvesters can trigger transition between different hydraulic states. Particularly, the rotational position of the casters is detected by position sensors and is used to determine the degree of lift and/or lowering of the rear end of the windrower to automatically level the rear end during changes in operation. The tolerance for how much rotational movement is necessary to trigger the transition can be manually inputted by the operator of the data processing system including the one or more position sensors. In some embodiments, the determination of whether a caster has reached the pre-determined rotational position is within the error range of the sensors and controllers involved in the determination. In some embodiments, the determination of whether a caster has reached the pre-determined rotational position or reached a pre-determined rotational position with a certain amount of frequency is within about ±10% of the pre-determined position and frequency value. In some embodiments, an operator determines the pre-determined rotational position and/or frequency values. In some embodiments, a controller or other software program determines the pre-determined rotational position and/or frequency values. In some embodiments, an operator provides the pre-determined rotational position and/or frequency values via an operator interface that is in electronic communication with one or more controllers. In some embodiments, a combination of an operator and a controller or other software program determines the pre-determined rotational position and/or frequency values.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Windrowers and tractors, such as self-propelled windrowers, are well known in the agricultural industry, and the instant invention can be used with substantially any of such machines. Reference is made, for example, to U.S. Pat. Nos. 9,101,090 and 8,020,648; that illustrate such windrowers, the disclosures of which are incorporated herein by reference in their entireties. Embodiments of the present invention are particularly well suited, but in no way limited to, use with windrowers. The present invention may also find utility in agricultural harvesters including, for example, a non-self-propelled windrower, a forage harvester, and a lawn mower. Embodiments of the present disclosure are particularly well suited, but in no way limited to, use with any vehicle with a rear axle suspension system.

In some embodiments, the method is performed by a harvester comprising a crop supply chamber, a crop gating system, and one or more sensors. In some embodiments, the one or more sensors are capable of determining a range of information, including, but not limited to, one or a combination of: the size of a bale in the bale chamber (diameter and/or weight), the position of the tailgate, the position of the control arm, the position of the rear wall, and the position of the crop gating system. In some embodiments, the one or more sensors are in electronic communication with one or more controllers.

The disclosure provides exemplary rear suspension systems that can be used with a variety of axle systems, e.g., swing axle systems, solid axle suspension, upper-lower control arm suspension, or the like, without affecting the essence of the rear suspension system. It should be understood that the technology disclosed herein can be incorporated into or used in combination with a variety of hydraulic damping or suspension systems, such as, e.g., U.S. patent application Ser. No. 15/395,806, filed on Dec. 30, 3016; and U.S. patent application entitled "Position/Height-Based Hydraulic Suspension System and Methods of Using the Same", CNHi Ref. 53579, filed on Feb. 10, 2017, the entire contents of which are incorporated herein by reference. The hydraulic-based rear suspension on the windrower is a volume-based active hydraulic suspension system using a master hydraulic cylinder to vary the volume of fluid in a suspension system based on caster rotational orientation and the effect the orientation has on rear ride height. Position sensors are used to detect the rotational orientation of the caster relative to the frame and/or rear axle, and suspension feedback control is provided based on the detected rotational orientation.

Rather than conventional air bags or shock absorbers, single acting hydraulic actuators or cylinders are used. The cylinders can be pressurized on either the barrel or rod end depending on the configuration of the system. In either case, one end of the cylinder is pivotally attached to the main frame of the windrower, while the other end is pivotally attached to the sprung or rear axle. In some embodiments, the barrel end of the hydraulic actuator acts as the sprung surface.

The hydraulic actuators are plumbed in a fluidic manner to a central pump, one or more central accumulators, a master hydraulic actuator, and two directional valves. One directional valve controls the accumulator circuit with the barrel end of the hydraulic actuators into a normally closed, open to pump, or open to tank operating mode. The other directional valve controls the master hydraulic actuator between a normally closed, open to pump, or open to tank operating mode. The barrel end of the master hydraulic actuator is plumbed parallel to the barrel ends of the two hydraulic actuators and the accumulator. The rod end of the master hydraulic actuator is plumbed to a directional valve where it can be closed, open to the pump, or open to tank.

A position sensor reads the extension of the master hydraulic actuator. Position sensors are also provided to determine the position of the rear caster rotational orientation relative to the frame or rear axle. The accumulator provides the springing medium to the system, while the hydraulic actuators provide the ride height and transfer vertical motion from the axle(s) to the accumulator. The master hydraulic actuator provides ride height adjustment while the position sensors provide position feedback used to control the volume of pressurized fluid in the accumulator circuit through the extension of the master hydraulic actuator. The master hydraulic actuator is sized such that it can overcome the force exerted by the hydraulic actuators (e.g., suspension cylinders) on any windrower, while also having adequate volume to displace the volumes of the hydraulic actuators. The master hydraulic actuator has a larger bore and greater volume than the hydraulic actuators.

The exemplary rear suspension system does not necessitate shock absorbers, as the action of the fluid flowing through the system acts to dampen the suspension movement. The operator is not required to make manual suspension adjustments outside of the windrower. In particular, the operator no longer needs to insert the axle lockout pins when removing the header, as the hydraulic system can lock out to keep the rear end level. With proper component sizing, the suspension system can be pressured by the charge system (rather than the lift system), which has a lesser power requirement.

In some embodiments, the master hydraulic actuator can be removed from the system and ride height adjustments can be made with the main pump increasing and decreasing extension of the hydraulic actuators based on the caster position. In such embodiments, the logic would need to use hydraulic actuator extension to determine adequate adjustment, rather than adjusting the master hydraulic actuator to a known extension. In some embodiments, two separate hydraulic systems could be used instead of one hydraulic system, e.g., one for the left and one for the right of the windrower. In some embodiments, pressurized air rather than hydraulic fluid can be used without deviating from the disclosed rear suspension system. In such embodiments, an air pump of sufficient size and robustness is included in the system.

FIGS. 8-11 show rear perspective and detailed views of an exemplary harvester 100 of the present disclosure with components omitted for clarity. The harvester 100 includes a frame 102 (e.g., a vehicle frame) configured for attachment to an implement (e.g., a header) to be moved in a longitudinal working direction (e.g., a forward direction 104 and a reverse direction 106) across the ground. The harvester 100 includes a proximal or front end 108 and a distal or rear end 110. The front end 108 of the harvester 100 includes first and second front wheels 112a, 112b rotatably mounted to the frame 102 on either side of the harvester 100. Generally, the front wheels 112a, 112b do not have a suspension system. The harvester 100 includes a ballast box 130 mounted to a rear edge 132 of the frame 102.

The harvester 100 includes a rear suspension system 114 with rear axles 116a, 116b operably mounted to the frame 102 and positioned transversely to the longitudinal working direction of the harvester 100. The rear axles 116a, 116b are operably mounted to the frame 102 at one end and include caster connection points 118a, 118b on opposing ends (e.g., the outermost ends of the rear axles 116a, 116b). Each caster connection point 118a, 118b defines a substantially cylindrical, vertically oriented feature perpendicularly disposed relative to the remaining portion of the rear axles 116a, 116b. The rear suspensions system 114 includes first and second casters 120a, 120b pivotally mounted to the respective rear axles 116a 116b at a bottom end of the caster connection points 118a, 118b such that the casters 120a, 120b can pivot 360 degrees at the caster connection points 118a, 118b.

The extension of the caster connection points 118a, 118b defines the substantially vertical pivot axes 122a, 122b of the respective casters 120a, 120b. The rear suspension system 114 includes first and second position sensors 124a, 124b mounted at or near the caster connection points 118a, 118b and configured to detect the rotational position (as depicted by arrows 126a, 126b) of the respective casters 120a, 120b relative to the rear axles 116a, 116b. The harvester 100 includes a pair of ground wheels 128a, 128b mounted to the casters 120a, 120b.

The rear suspension system 114 includes a first hydraulic cylinder or actuator 134a operably mounted to the rear axle 116a via a mounting bracket 136a. Based on the detected rotational position of the caster 120a (as received from the position sensor 124a), the hydraulic actuator 134a is configured to adjust the extension or retraction of a rod 138a from a barrel 140a of the hydraulic actuator 134a to adjust the level of the caster 120a relative to the frame 102 and/or ground. The rear suspension system 114 includes a second hydraulic cylinder or actuator 134b operably mounted to the rear axle 116b via a mounting bracket 136b. Based on the detected rotational position of the caster 120b (as received from the position sensor 124b), the hydraulic actuator 134b is configured to adjust the extension or retraction of a rod from a barrel of the hydraulic actuator 134b to adjust the level of the caster 120b relative to the frame 102 and/or ground.

The rear suspension system 114 includes a master hydraulic cylinder or actuator 142 in fluid communication with the hydraulic actuators 134a, 134b. The master hydraulic actuator 142 includes a barrel 144 and a rod 146 configured to be extended or retracted from the barrel 144. The master hydraulic actuator 142 can be mounted to the frame 102 near the rear end 132 by a mounting bracket 148. The rear suspension system 114 can include a position sensor 150 configured to detect a magnitude of extension or retraction of the rod 146 from the barrel 144. The rear suspension system 114 includes one or more accumulators 152 mounted to the frame 102 near the rear end 132 and in fluid communication with the hydraulic actuators 134a, 134b. The rear suspension system 114 includes a hydraulic valve manifold 154 mounted to the frame 102 near the rear end 132 and in fluid communication with a pump 156 and a tank 158. The position of the pump 156 and tank 158 is only for illustrative purposes, and it should be understood that the pump 156 and/or tank 158 can be located anywhere in the harvester 100.

The rear suspension system 114 includes hydraulic lines 160, 162 that fluidically connect the barrels of the respective hydraulic actuators 134a, 134b with the barrel 144 of the master hydraulic actuator 142. The rear suspension system 114 includes hydraulic lines 164, 166 that fluidically connect the barrels of the respective hydraulic actuators 134a, 134b with the accumulator 152. The rear suspension system 114 includes a hydraulic line 168 that fluidically connects the barrel 144 of the master hydraulic actuator 142 with the accumulator 152. The rear suspension system 114 includes hydraulic lines 170, 172 that fluidically connect the accumulator 152 to the pump 156 and tank 158, respectively. The barrel 144 of the master hydraulic actuator 142 is therefore plumbed parallel to the barrels of the hydraulic actuators 134a, 134b.

The hydraulic actuators 134a, 134b are plumbed via the hydraulic lines 164, 166 to a first directional valve (within the valve manifold 154), and the valve can be operably closed, open to the pump 156, or open to the tank 158, thereby adjusting the extension or retraction of the rods in the hydraulic actuators 134a, 134b. The rod 146 of the master hydraulic actuator 142 is plumbed via the hydraulic line 168 to a second directional valve (within the accumulator 152), and the valve can be operably closed, open to the pump 156, or open to the tank 158, thereby adjusting the extension or retraction of the rod 146 from the barrel 144.

In operation, the accumulator 152 is open to pump 156 to provide pressurized fluid adequate to lift the rear end 110 of the windrower 100 to the desired ride height. This value is either a predetermined constant with feedback provided by the position sensors 124a, 124b associated with the hydraulic actuators 134a, 134b, or a simple operator input where the operator raises the rear suspension hydraulic actuators 134a, 134b until the desired ride height is achieved. At the desired set-point, the master hydraulic actuator 142 is extended to a position such that there is adequate volume (in either extension or retraction, depending on the configuration) for the master hydraulic actuator 142 to compensate for either rising or squatting of the rear end 110.

For example, if the windrower 100 is reversed and the rear end 110 rises three inches, the master hydraulic actuator 142 is extended by allowing the rod 146 end to empty to tank 158 by an amount adequate to retract the hydraulic actuators 134a, 134b enough to lower the rear of the windrower 100 three inches. Likewise, if the rear end 110 of the windrower 100 normally lowers during reversing, the rod 146 end of the master hydraulic actuator 142 is pressurized, displacing fluid from the barrel 144 end into the hydraulic actuators 134a, 134b. It should be understood that the hydraulic actuators 134a, 134b can be actuated independently of each other. This actuation causes the hydraulic actuators 134a, 134b to extend by an amount adequate to lift the rear end 110 of the windrower 100 and keep the rear end 110 level. The position of the master hydraulic actuator 142 is controlled by the position of the caster wheel position sensors 124a, 124b. As the effect of the wheel orientation is based on the geometry of the system (the rear end 110 of the windrower 100 will rise or squat consistently based on the orientation of the wheels 128a, 128b), the master hydraulic actuator 142 can be extended or retracted based purely on the rotational orientation of the wheels 128a, 128b (as measured by the position sensors 124a, 124b).

Upon achieving the desired ride height based on the desired predetermined master hydraulic actuator 142 position, the valves close both the accumulator 152 and the master hydraulic actuator 142 circuits to both pump 156 and tank 158. At this point, the accumulator 152 acts as a passive spring. The master hydraulic actuator 142 remains in the set point or level position during any operation where it has been determined that the rear end 110 of the windrower 100 will neither rise nor squat excessively. That is, the master hydraulic actuator 142 will not make extension adjustments (accumulator 152 circuit volume adjustments) unless the caster wheels 128a, 128b have rotated to a predetermined degree (e.g., a minimum of a ±5° differential, a minimum of about a ±10° differential, a minimum of about a ±15° differential, about a minimum of about a ±20° differential, a minimum of about a ±25° differential, a minimum of about a ±30° differential, a minimum of about a ±35° differential, a minimum of about a ±40° differential, or a minimum of about a ±45° differential, from a straight ahead position represented as about ±0°). This eliminates constant adjustment due to normal in-field caster 120a, 120b shimmy.

Upon reversing the windrower 100 (or turning to a degree that rotates the caster wheels 128a, 128b to a point that will substantially affect rear ride height) the rod 146 end of the master hydraulic actuator 142 is open to either pump 156 or tank 158 (depending on the demand of the rear axle 116a, 116b) to displace fluid to adjust the rear end 110 ride height. If the master hydraulic actuator 142 is open to tank 158, the pressure in the accumulator 152 circuit extends the master hydraulic actuator 142. If the master hydraulic actuator 142 is open to pump 156, the master hydraulic actuator 142 is retracted to displace fluid into the hydraulic actuators 134a, 134b and raise the ride height. In either case, the extension of the master hydraulic actuator 142 is controlled by the orientation of the caster wheels 128a, 128b.

For example, the master hydraulic actuator 142 will be extended or retracted a predetermined amount based on the requirements of the system if the caster wheel 128a, 128b is rotated ninety degrees, and the geometry of the system would otherwise cause the rear end 110 of the windrower 100 to drop three inches at this orientation; the master hydraulic actuator 142 is retracted to a position which displaces enough fluid to extend the hydraulic actuators 134a, 134b three inches, thereby keeping the rear end 110 of the windrower 100 level. The extension of the master hydraulic actuator 142 is determined by the position sensor 150 on the master hydraulic actuator 142, which can be an electronic sensor operated by the extending or retracting rod 146 end of the master hydraulic actuator 142 and provides position feedback to the controller.

Figure 8:
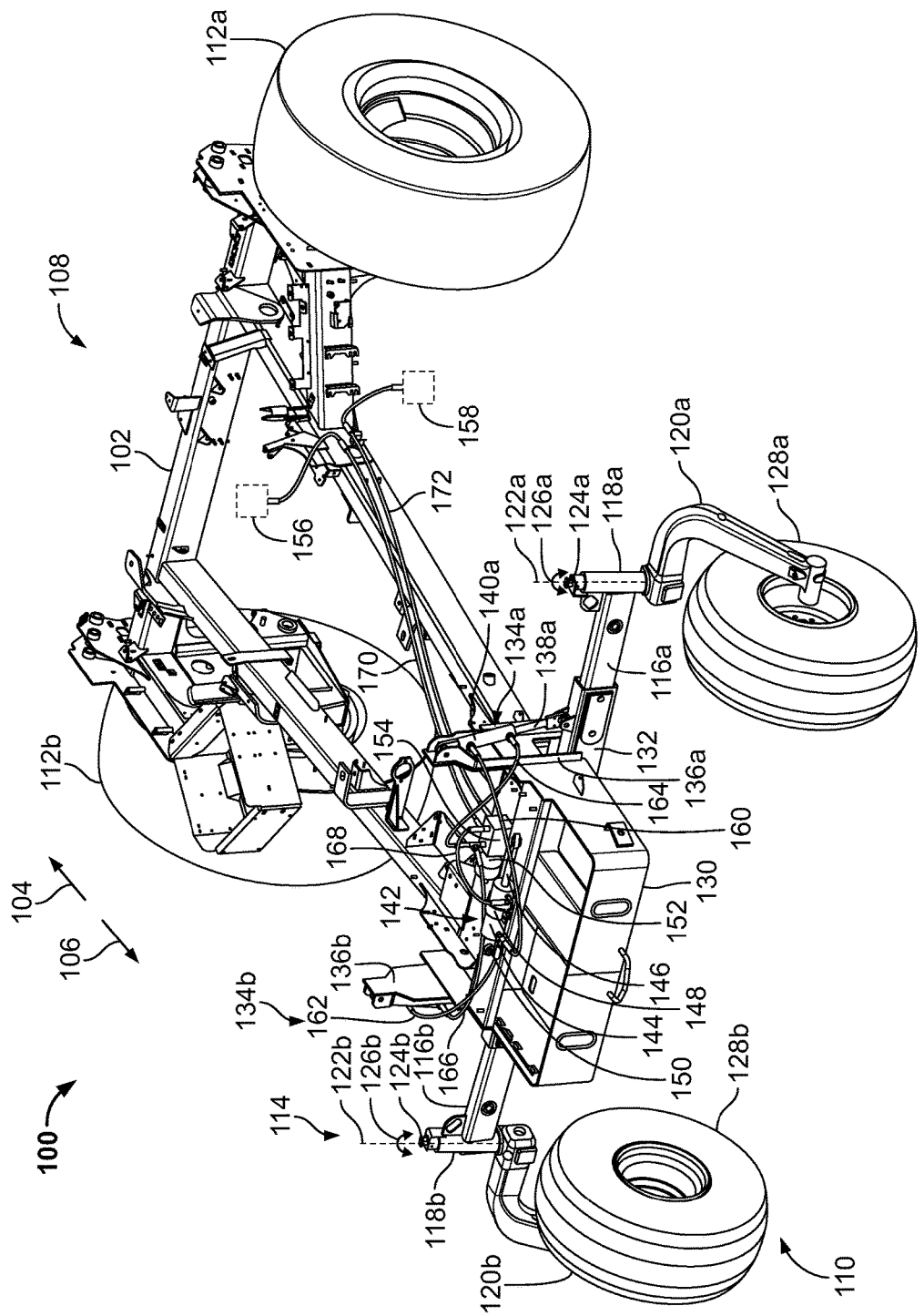
FIG. 8 is a rear, perspective view of an exemplary rear suspension system attached to a frame of a windrower and configured for a forward direction of travel.
Figure 9:
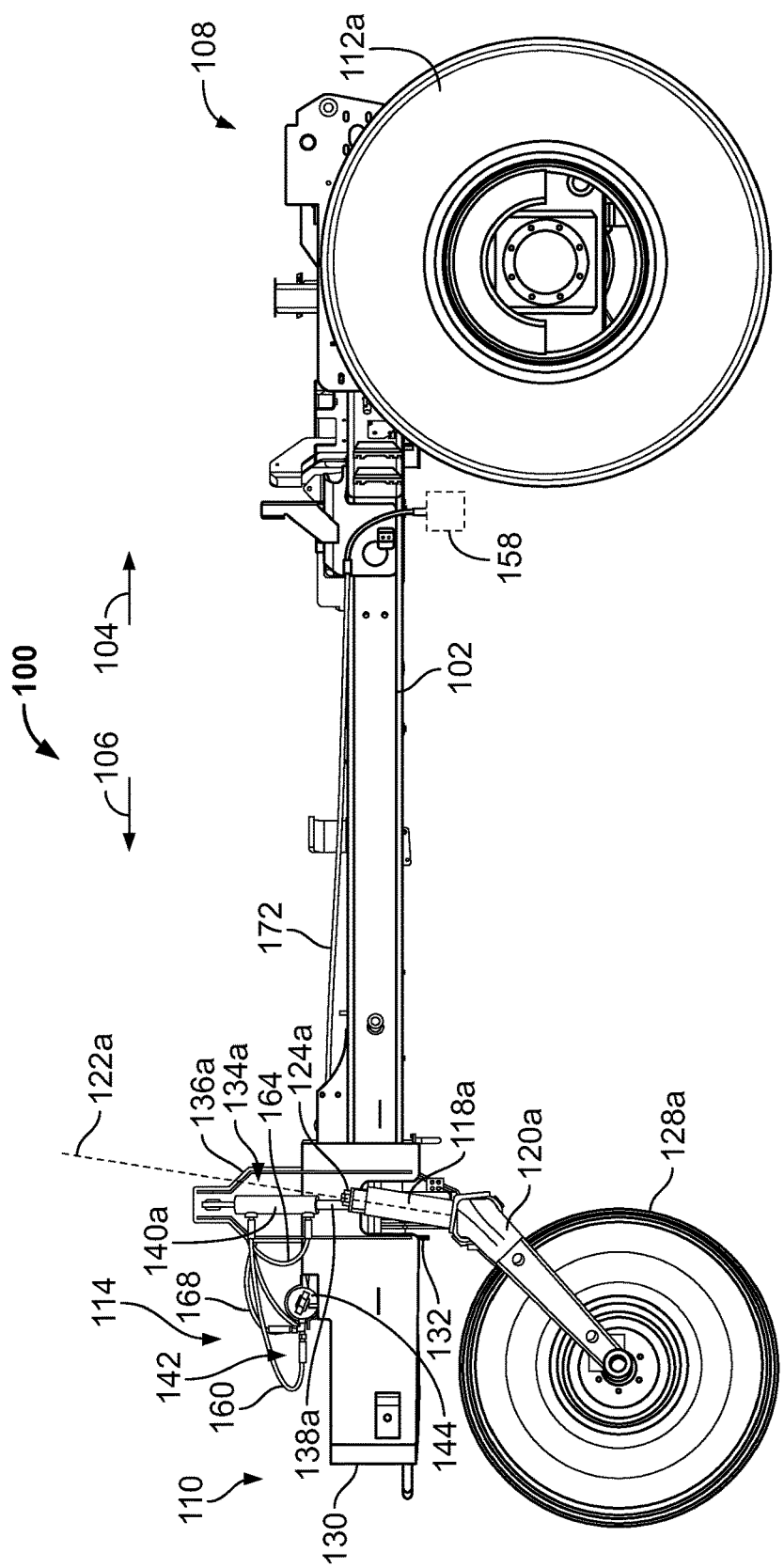
FIG. 9 is a side view of an exemplary rear suspension system attached to a frame of a windrower and configured for a forward direction of travel.
Figure 10:
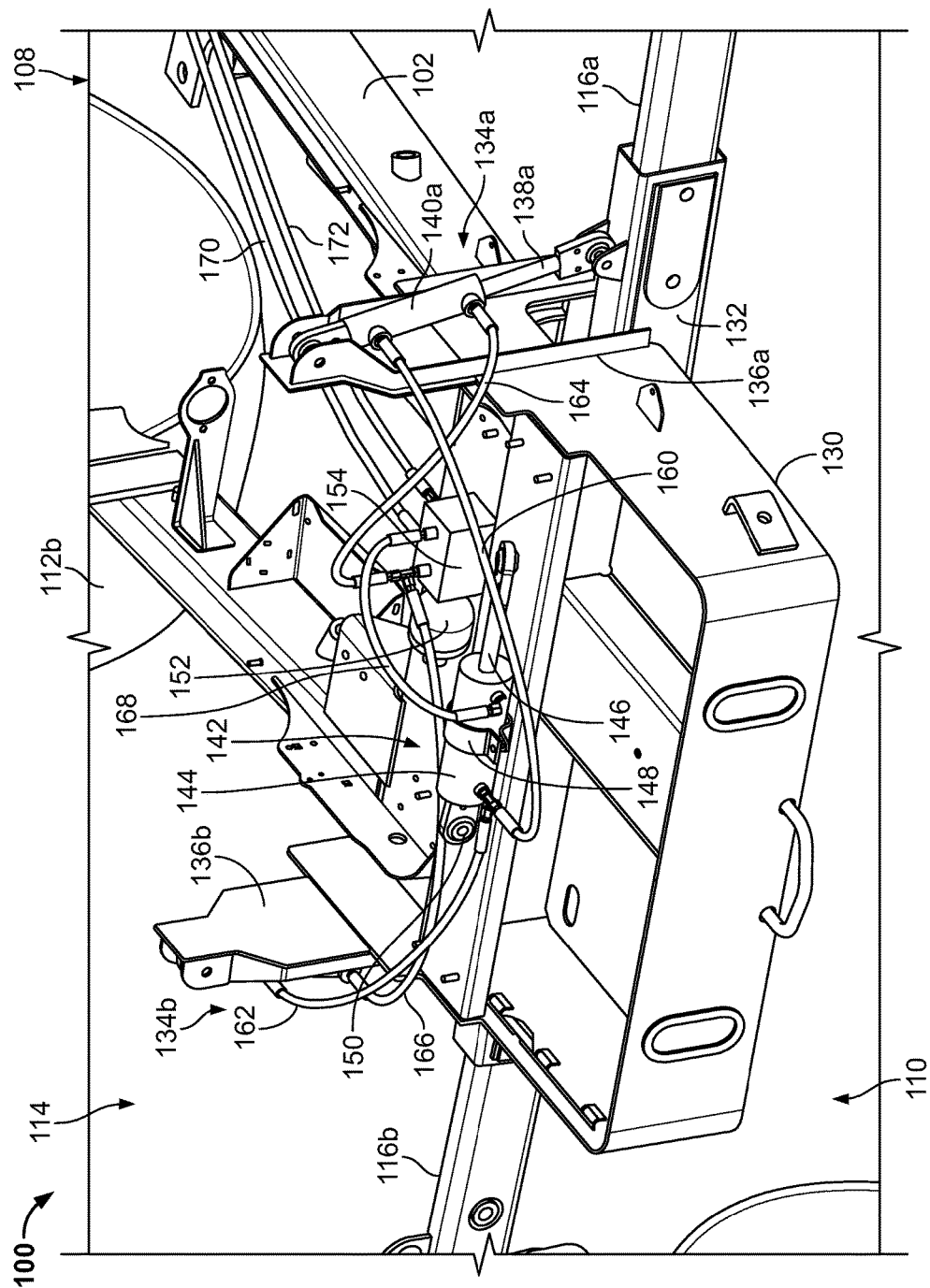
FIG. 10 is a rear, perspective and detailed view of an exemplary rear suspension system configured for a forward direction of travel.
Figure 11:
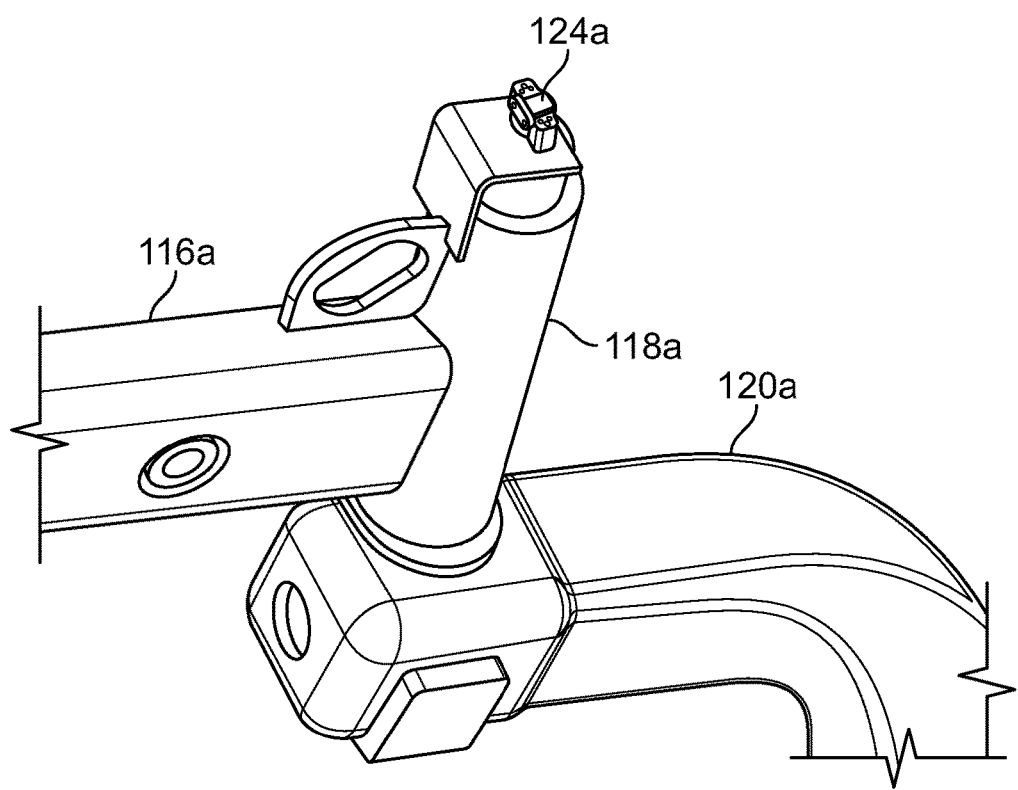
FIG. 11 is a detailed view of an exemplary rear suspension system including a position sensor mounted to a caster.

FIGS. 8 and 9 show the casters 120a, 120b orientated in a normal or forward direction of travel. In particular, both casters 120a, 120b are rotated to position the caster wheels 128a, 128b aft of the rear axle 116a, 116b. Based on the rotational position of the casters 120a, 120b, the hydraulic actuators 134a, 134b are in a pre-set extended position for normal ride height and open to the accumulator 152 for springing (e.g., damping) of the axles 116a, 116b. The master hydraulic actuator 142 is in an approximately 50% extended position, with adequate volume to adjust the rear of the windrower 100 up or down.

Figure 12:
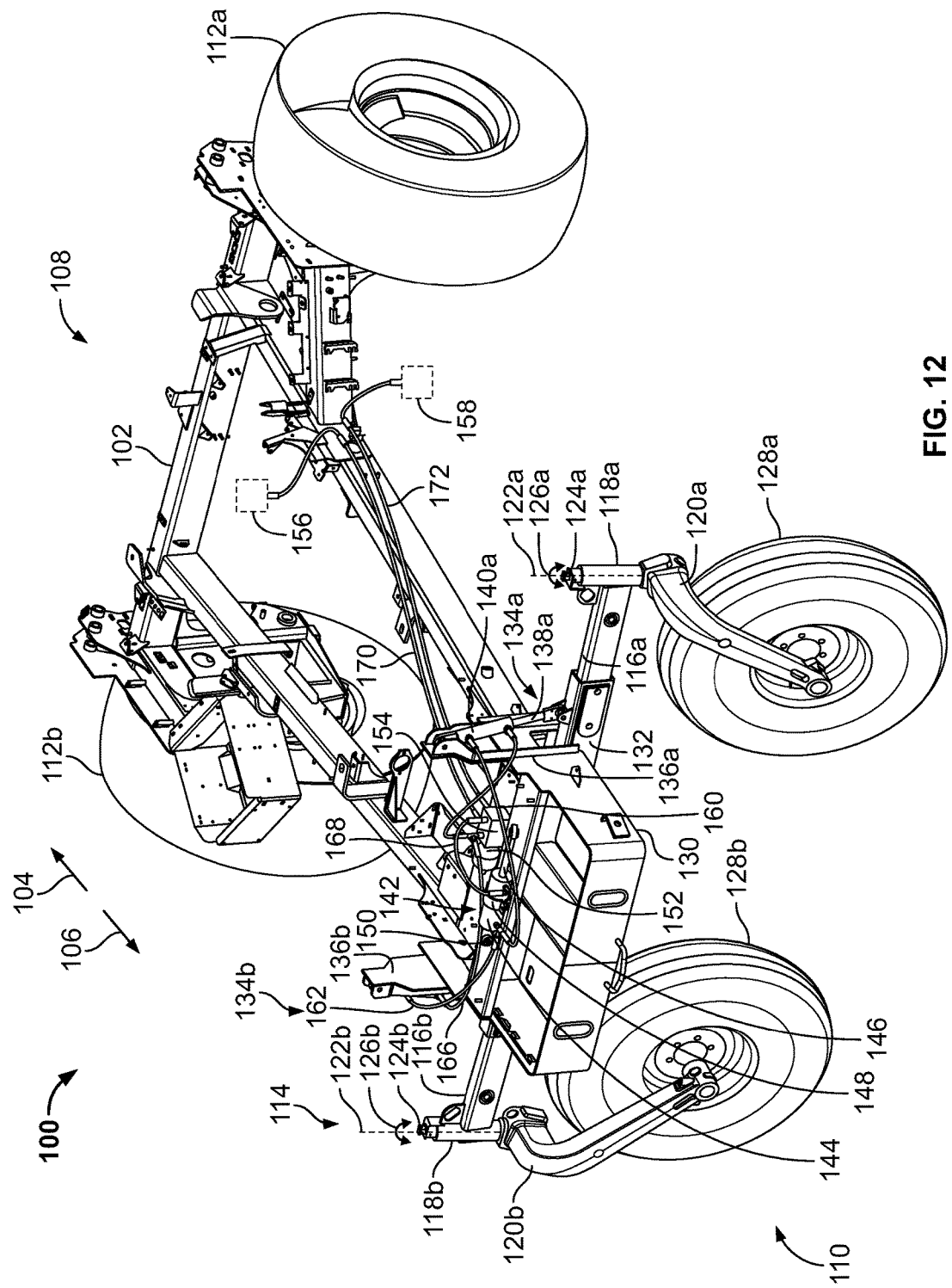
FIG. 12 is a rear, perspective view of an exemplary rear suspension system attached to a frame of a windrower with both caster wheels turned inward.

FIG. 12 shows the casters 120a, 120b turned inwardly toward each other. Due to both of the casters 120a, 120b being in a non-parallel plane of rotation and the shortening of the moment arm from the axle pivot to the ground contact point (a fixed geometry taken as input to the position function), the rear of the windrower 100 rises. The controller calculates the amount of rise based on both casters 120a, 120b being rotated inwardly and extends the master actuator 142 to retract the hydraulic actuators 134a, 134b, thereby lowering the rear of the windrower 100. The hydraulic actuators 134a, 134b remain open to the accumulator 152.

Figure 13:
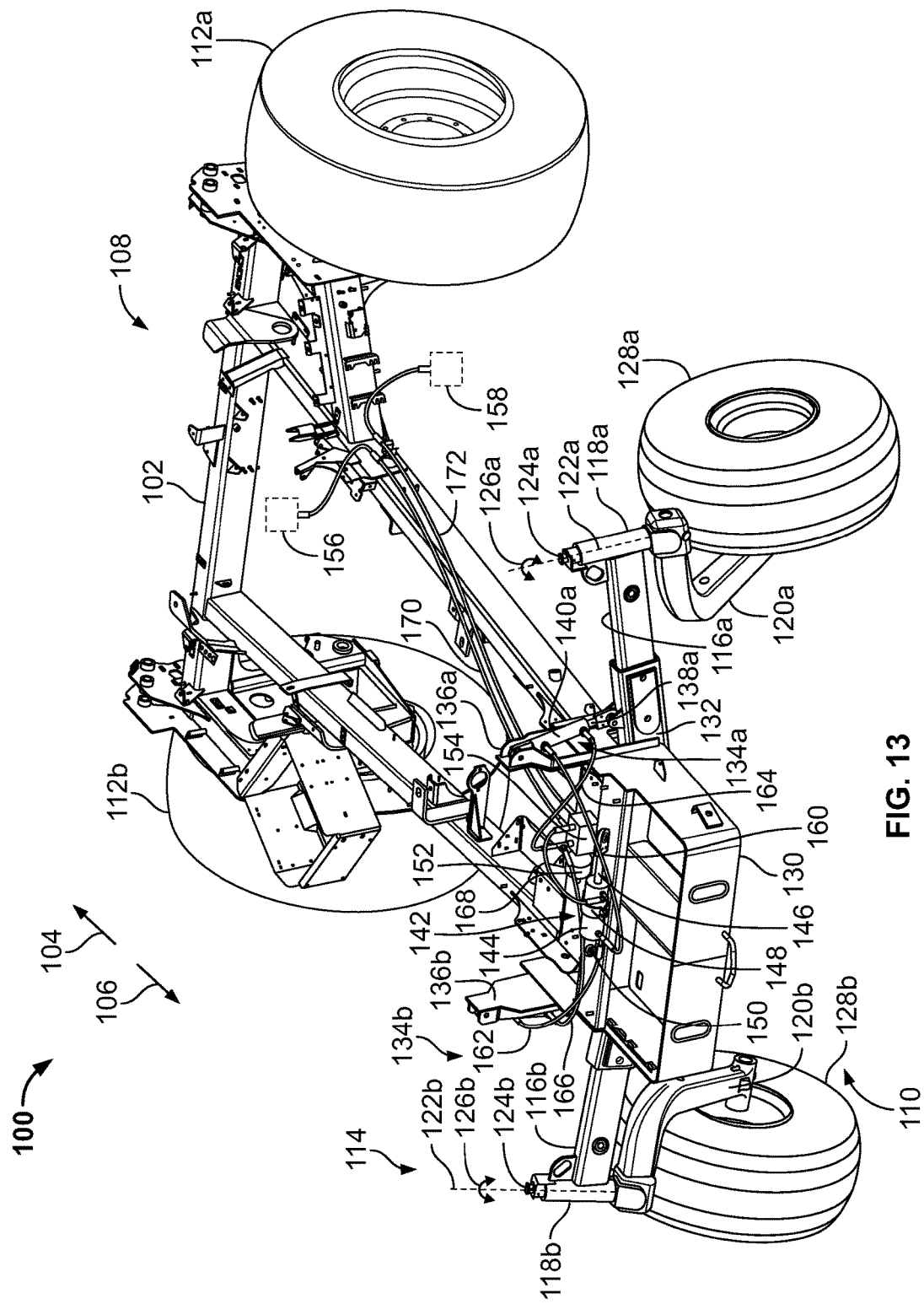
FIG. 13 is a rear, perspective view of an exemplary rear suspension system attached to a frame of a windrower with hydraulic actuators retracted during a reverse direction of travel.

FIG. 13 shows the casters 120a, 120b rotated to position the caster wheels 128a, 128b fore of the rear axle 116a, 116b. Such positioning of the casters 120a, 120b causes the rear of the windrower 100 to rise. The controller calculates the amount of rise based on both casters 120a, 120b, and extends the master hydraulic actuator 142 to retract the hydraulic actuators 134a, 134b, thereby lowering the rear of the windrower 100. The hydraulic actuators 134a, 134b remain open to the accumulator 152.

Figure 14:
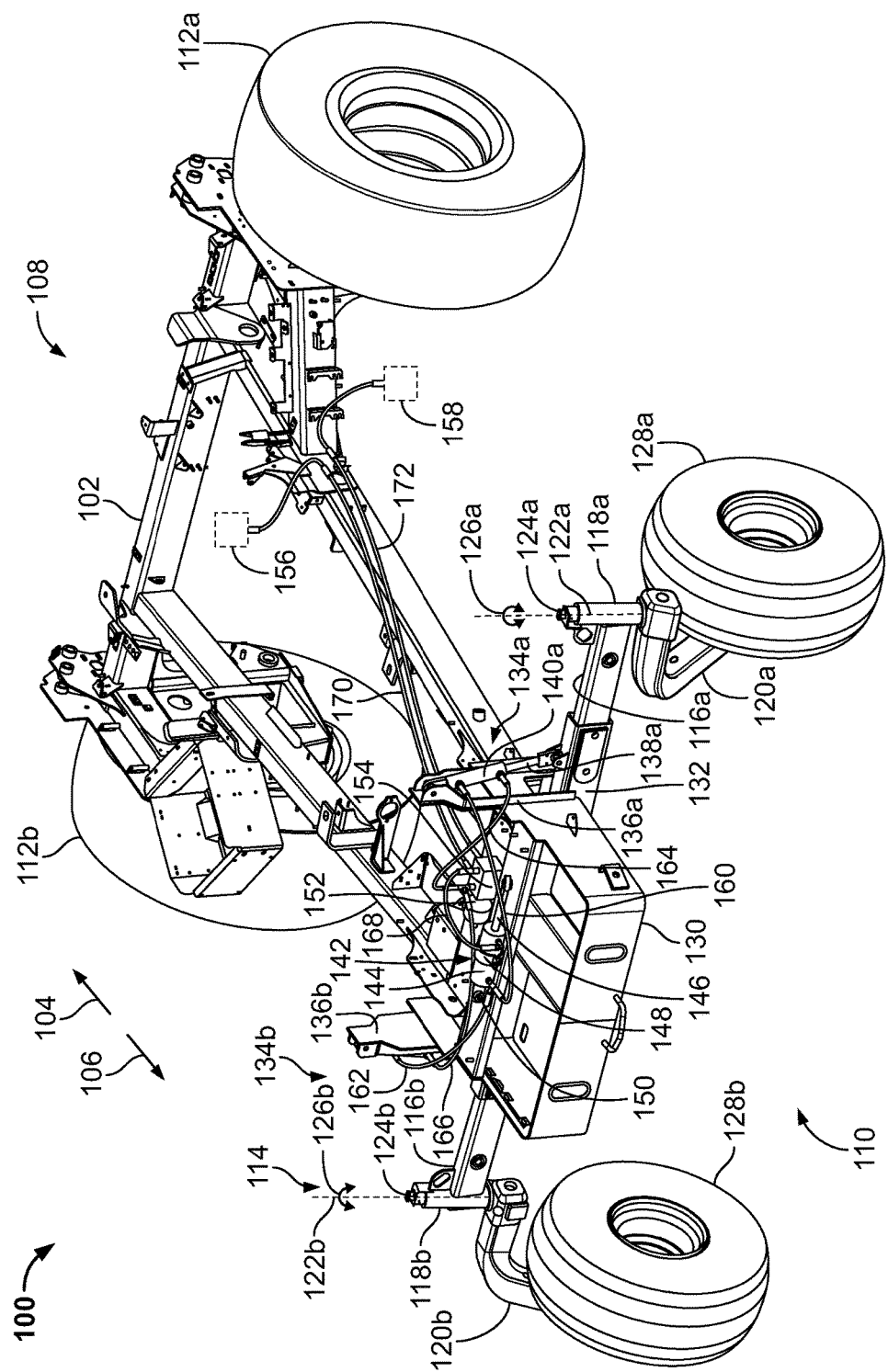
FIG. 14 is a rear, perspective view of an exemplary rear suspension system attached to a frame of a windrower with one caster wheel fore and one caster wheel aft of a rear axle.

FIG. 14 shows one caster 120a rotated to position the caster wheel 128a fore of the rear axle 116a, and another caster 120b rotated to position the caster wheel 128b aft of the rear axle 116b. Such positioning of the casters 120a, 120b causes the rear of the windrower 100 to rise, but only by approximately half of the rise shown in FIG. 13 since one wheel 128a is forward and the other wheel 128b is rearward of the axles 116a, 116b. The controller calculates the amount of rise based on both casters 120a, 120b and extends the master hydraulic actuator 142 to retract the hydraulic actuators 134a, 134b, thereby lowering the rear of the windrower 100. The hydraulic actuators 134a, 134b remain open to the accumulator 152.

Figure 15:
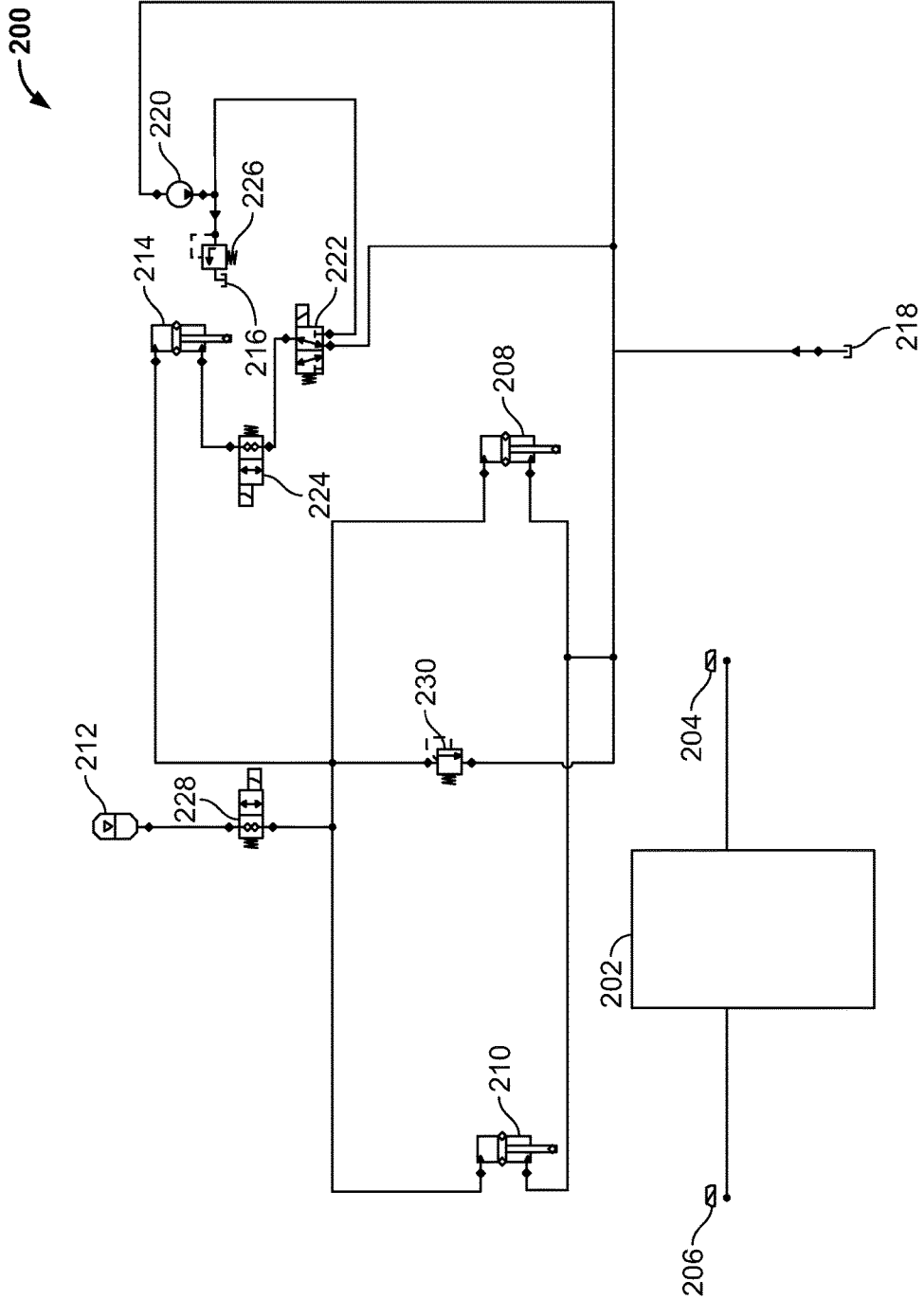
FIG. 15 is a static image of a hydraulic circuit for an exemplary rear suspension system.

FIG. 15 is a static image of a hydraulic circuit 200 for the exemplary rear suspension system disclosed herein. The hydraulic circuit 200 includes a controller 202 communicatively connected to a right-hand side or first position sensor 204 and a left-hand side or second position sensor 206. The hydraulic circuit 200 includes a right-hand side or first hydraulic actuator 208 and a left-hand side or second hydraulic actuator 210 in fluid communication via hydraulic lines. The hydraulic circuit 200 includes an accumulator 212 and a master hydraulic actuator 214. The hydraulic circuit 200 includes pressurized fluid reservoirs 216, 218 from which pressurized fluid can be introduced into the hydraulic circuit 200 via a pump 220. The hydraulic circuit 200 further includes a first directional valve 222, a second directional valve 224, a relief valve 226, an accumulator valve 228, and a master hydraulic relief valve 230.

Figure 16:
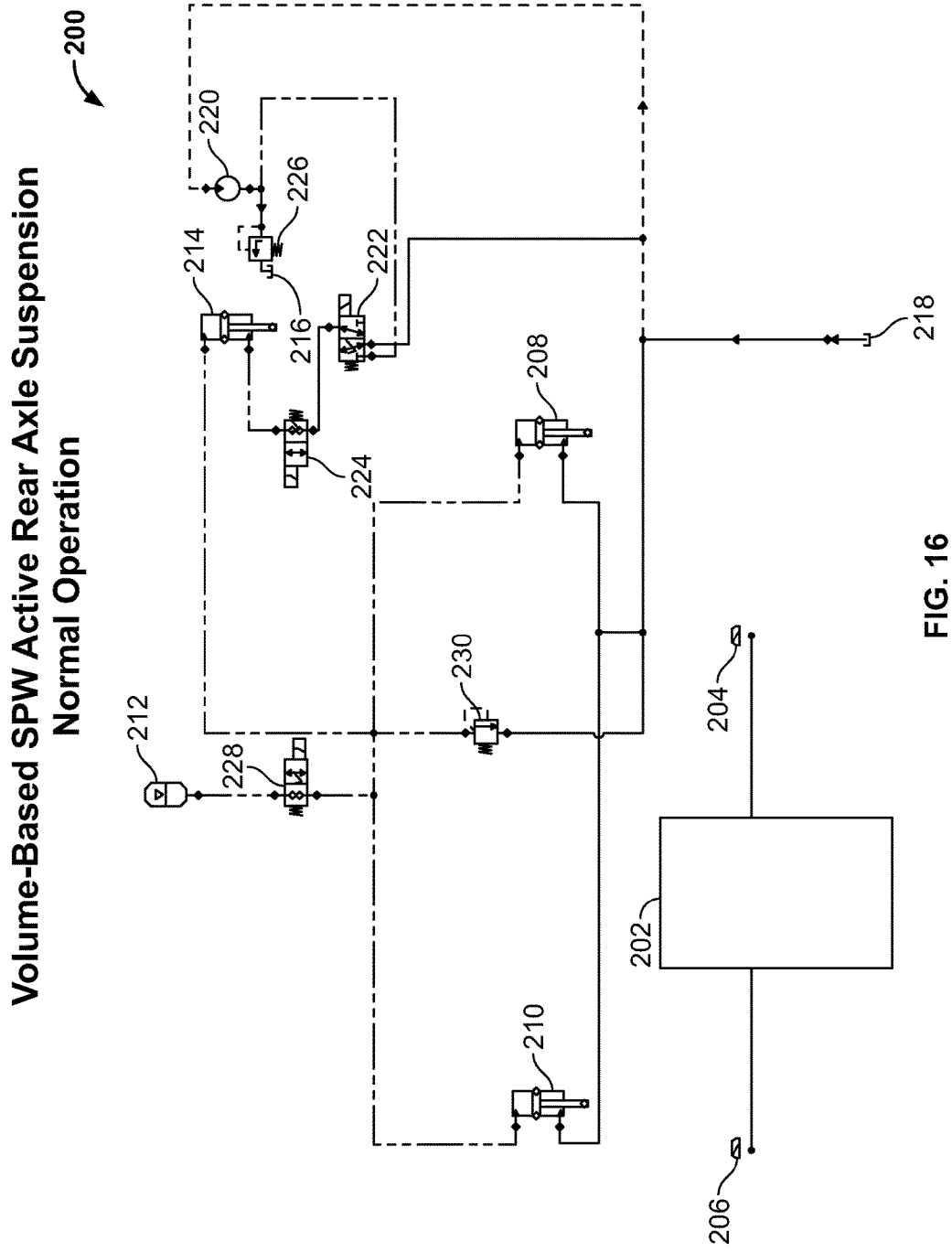
FIG. 16 is the hydraulic circuit of FIG. 15 in a normal operation mode.

FIG. 16 is the hydraulic circuit 200 of FIG. 15 in a normal or forward moving operation mode. The hydraulic actuators 208, 210 and the accumulator 212 carry the weight of the rear end of the windrower. The master hydraulic actuator 214 is set at approximately 50% extension, and is able to extend or retract to displace adequate volume of the pressurized fluid to lift or lower the rear end of the windrower based on the caster position.

Figure 17:
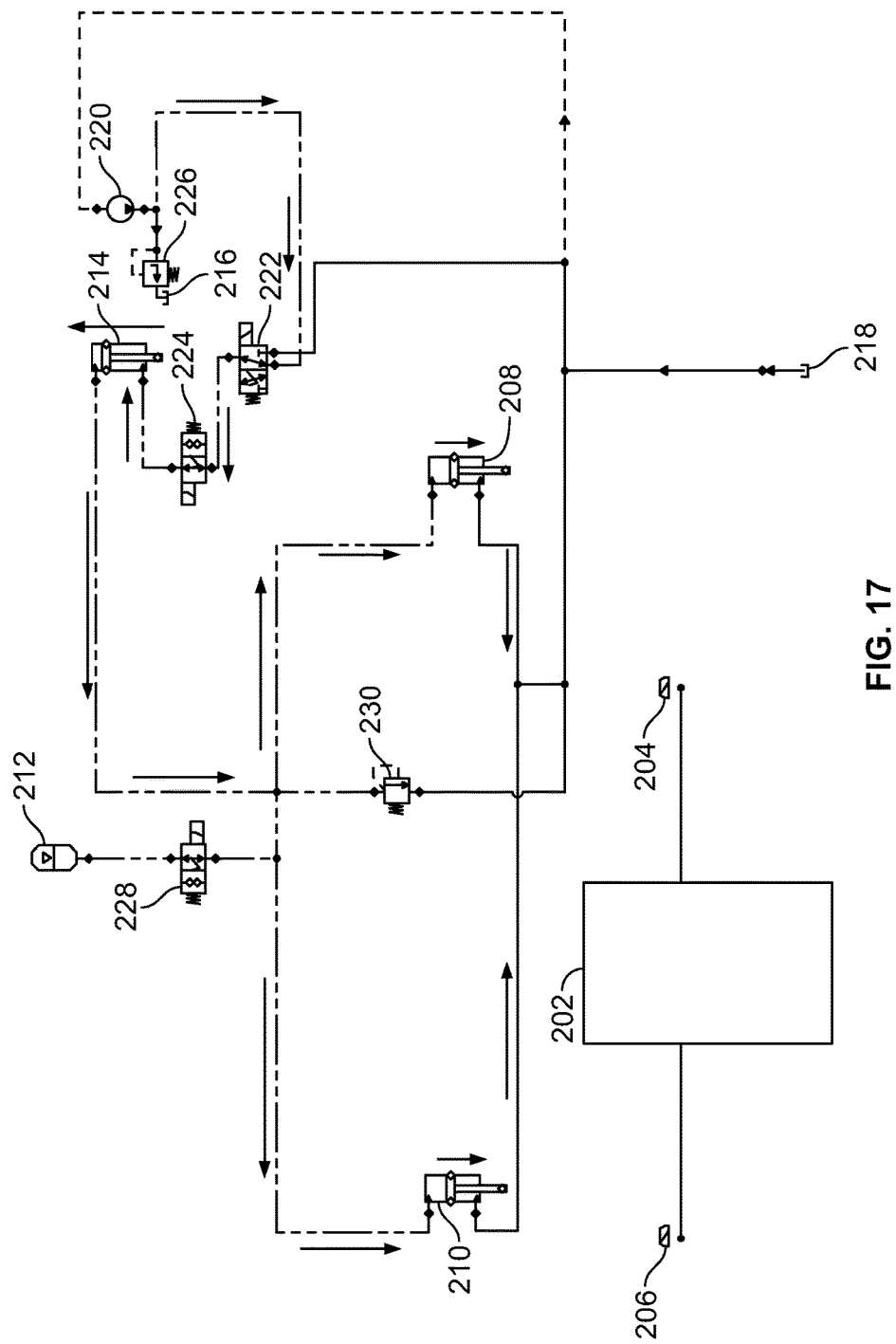
FIG. 17 is the hydraulic circuit of FIG. 15 in an action-to-raise-rear operation mode.

FIG. 17 is the hydraulic circuit 200 of FIG. 15 in an action-to-raise-rear operation mode. Heavy arrows depict the direction in which the pressurized fluid flows through the circuit 200. The casters are moving to a position which will cause the rear end of the windrower to drop. Thus, the master hydraulic actuator 214 is retracted to displace the pressurized fluid into the hydraulic actuators 208, 210 to raise the rear end. The master hydraulic actuator 214 extends or retracts a predetermined amount, using the position feedback of the master hydraulic actuator 214, based on the caster geometry, geometry axle, and overall windrower weight balance fore/aft to displace a volume of pressurized fluid adequate to raise the rear end.

Figure 18:
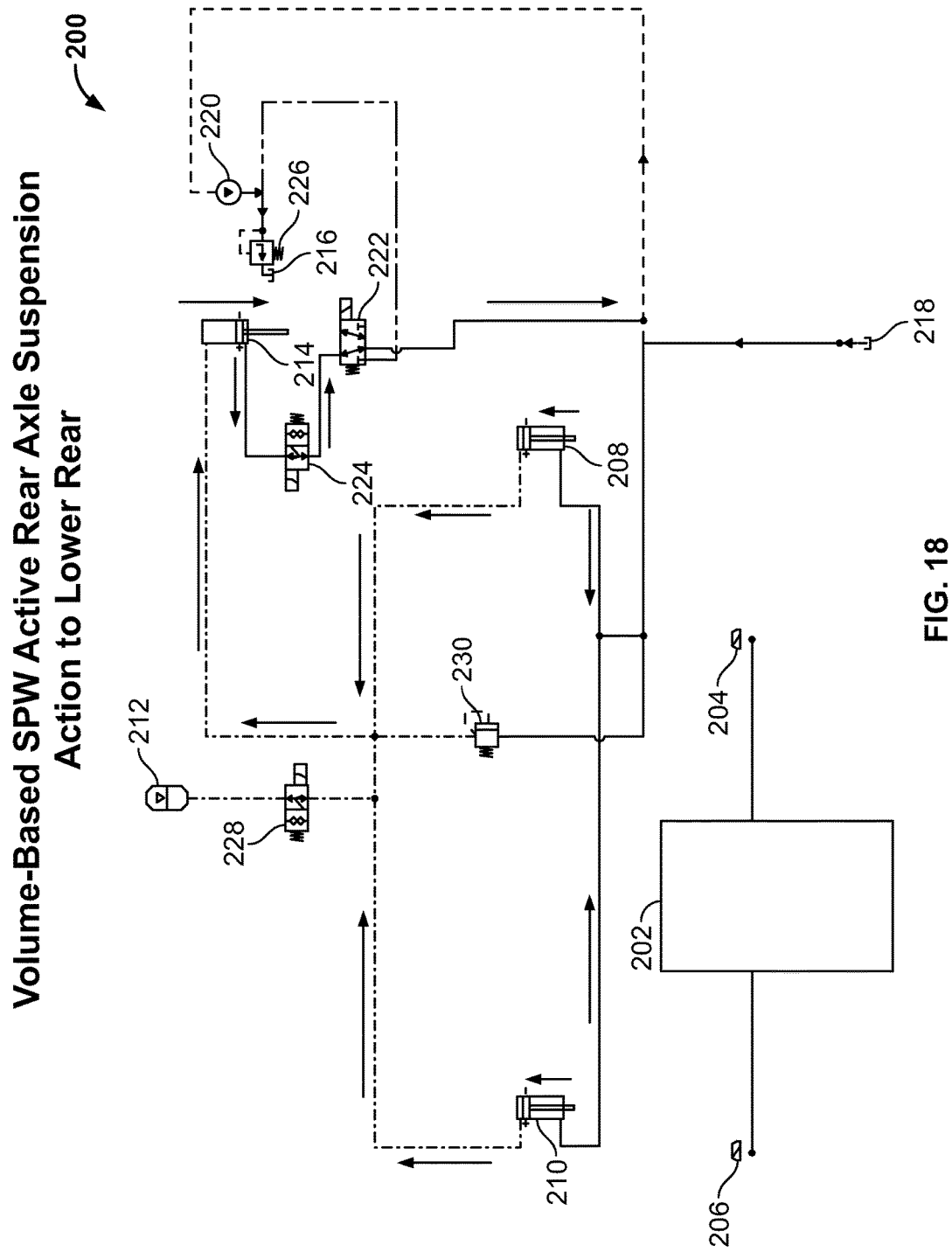
FIG. 18 is the hydraulic circuit of FIG. 15 in an action-to-lower-rear operation mode.

FIG. 18 is the hydraulic circuit 200 of FIG. 15 in an action-to-lower-rear operation mode. Heavy arrows depict the direction in which the pressurized fluid flows through the circuit 200. The casters are moving to a position that will cause the rear end of the windrower to raise. Thus, the master hydraulic actuator 214 extends to displace the pressurized fluid from the retracting hydraulic actuators 208, 210 and allows the rear end of the windrower to lower. In some embodiments, the weight of the windrower can force the pressurized fluid from the barrel end of the hydraulic actuators 208, 210 to the barrel end of the master hydraulic actuator 214.

Figure 19:
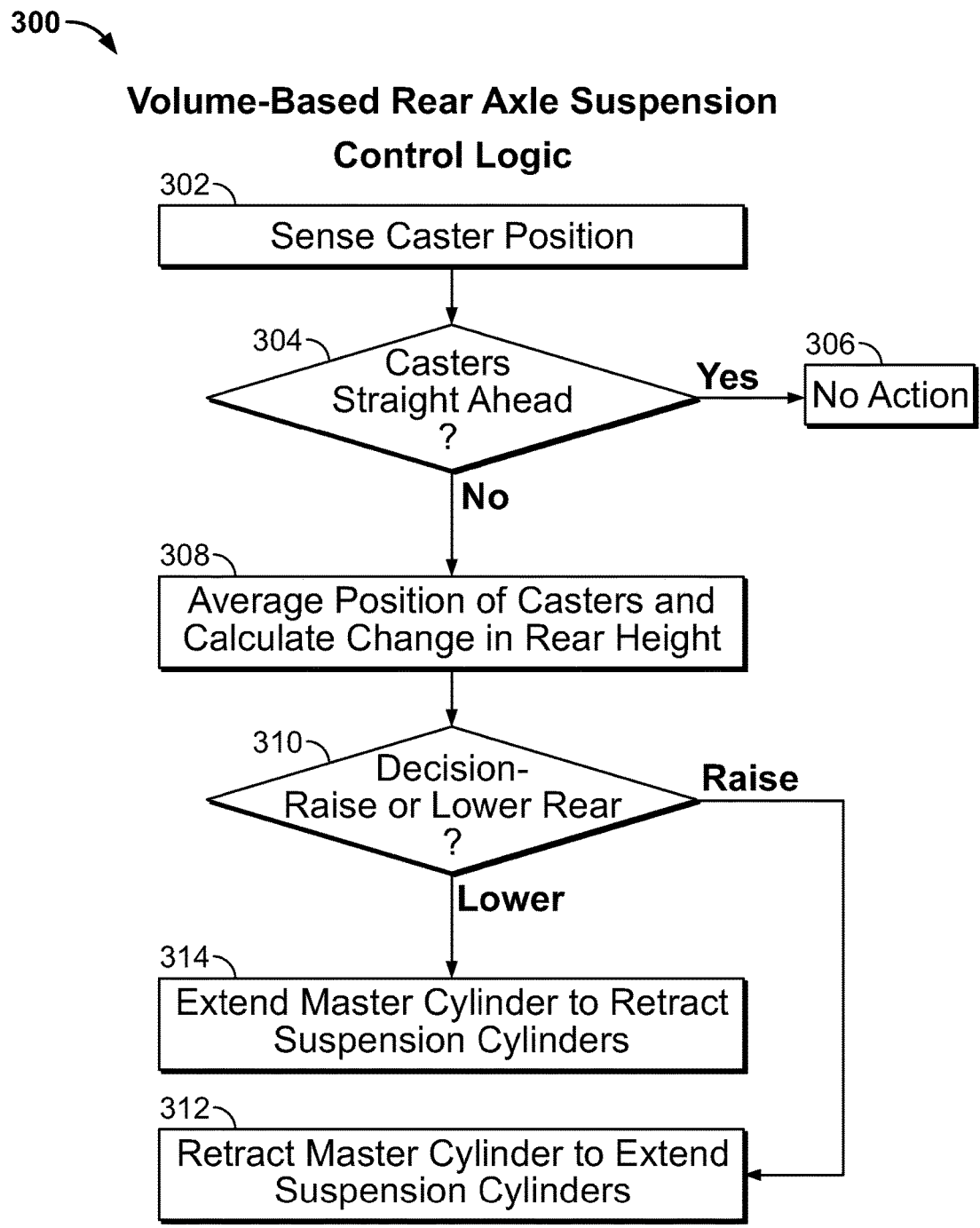
FIG. 19 is a flow chart for control logic of the hydraulic circuit.

FIG. 19 is a flow chart which illustrates the logic tree 300 in a controller and software system that controls when and if the casters are detected to move rotationally relative to the rear axles. At step 302, the caster position is detected by position sensors. At step 304, a determination is made whether the casters are straight ahead based on the detected rotational position relative to the rear axle. At step 306, if the casters are straight ahead, no action is taken. At step 308, an average position of the casters is determined and a change in rear height is calculated. At step 310, a determination is made whether to raise or lower the rear end of the windrower. At step 312, if the decision is made to raise the rear end, the master hydraulic actuator is retracted to extend the hydraulic actuators connected to the rear axles. At step 314, if the decision is made to lower the rear end, the master hydraulic actuator is extended to retract the hydraulic actuators connected to the rear axles.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A harvester, comprising:
   a vehicle frame configured for attachment to an implement to be moved in a longitudinal working direction across the ground;
   at least one rear axle positioned transversely to the longitudinal working direction of the harvester and operably attached to the vehicle frame, the rear axle comprising first and second caster connection points on opposing sides of the harvester;
   a first caster pivotally mounted to the rear axle at the first caster connection point;
   a second caster pivotally mounted to the rear axle at the second caster connection point;
   a first position sensor configured to detect a rotational position of the first caster relative to the rear axle;
   a second position sensor configured to detect a rotational position of the second caster relative to the rear axle;
   a first hydraulic actuator operably mounted to the rear axle and configured to level the first caster based on the rotational position of the first caster detected by the first position sensor; and
   a second hydraulic actuator operably mounted to the rear axle and configured to level the second caster based on the rotational position of the second caster detected by the second position sensor.

2. The harvester of claim 1, comprising a master hydraulic actuator in fluid communication with the first and second hydraulic actuators.

3. The harvester of claim 2, comprising a third position sensor configured to detect a magnitude of extension of the master hydraulic actuator.

4. The harvester of claim 1, comprising an accumulator in fluid communication with the first and second hydraulic actuators.

5. The harvester of claim 1, comprising a hydraulic valve manifold, the first and second hydraulic actuators each in fluid communication with a pump and a tank via the hydraulic valve manifold.

6. The harvester of claim 1, comprising a first directional valve and a second directional valve.

7. The harvester of claim 6, wherein the first directional valve is in fluid communication with an accumulator and the first and second hydraulic actuators, the first directional valve configured to control the accumulator between closed, open to pump, or open to tank operable modes with barrel ends of the first and second hydraulic actuators.

8. The harvester of claim 6, wherein the second directional valve is in fluid communication with a master hydraulic actuator, the second directional valve configured to control the master hydraulic actuator between closed, open to pump, or open to tank operable modes.

9. The harvester of claim 1, wherein the first position sensor is mounted at the first caster connection point, the first caster connection point defining a pivot axis of the first caster.

10. The harvester of claim 1, wherein the second position sensor is mounted at the second caster connection point, the second caster connection point defining a pivot axis of the second caster.

11. The harvester of claim 1, comprising a first pair of ground wheels mounted on the first and second casters.

12. The harvester of claim 1, comprising a ballast box mounted to a rear edge of the vehicle frame.

13. The harvester of claim 1, wherein the harvester is chosen from: a windrower, a lawn mower, a forage harvester, or a tractor.

* * * * *